(12) United States Patent
Jung

(10) Patent No.: US 10,009,746 B2
(45) Date of Patent: Jun. 26, 2018

(54) METHOD FOR SYNCHRONIZING PROXIMITY NETWORK AND ELECTRONIC DEVICE THEREOF

(71) Applicant: Samsung Electronics Co., Ltd., Gyeonggi-do (KR)

(72) Inventor: Bu-Seop Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 32 days.

(21) Appl. No.: 15/219,844

(22) Filed: Jul. 26, 2016

(65) Prior Publication Data

US 2017/0150296 A1  May 25, 2017

(30) Foreign Application Priority Data

Nov. 25, 2015 (KR) ........................ 10-2015-0165253

(51) Int. Cl.
*H04W 4/00* (2018.01)
*H04W 8/00* (2009.01)
*H04L 12/18* (2006.01)
*H04W 56/00* (2009.01)
*H04W 4/80* (2018.01)
*H04W 84/18* (2009.01)

(52) U.S. Cl.
CPC ........... *H04W 4/80* (2018.02); *H04L 12/1886* (2013.01); *H04W 4/008* (2013.01); *H04W 8/005* (2013.01); *H04W 56/001* (2013.01); *H04W 84/18* (2013.01)

(58) Field of Classification Search
CPC ... H04W 4/008; H04W 8/005; H04W 56/001; H04W 84/18; H04L 12/1886
USPC ........................................................ 455/41.2
See application file for complete search history.

(56) References Cited

U.S. PATENT DOCUMENTS

| 2010/0317371 | A1  | 12/2010 | Westerinen et al. |
| 2011/0177802 | A1  | 7/2011  | Gupta |
| 2014/0244779 | A1* | 8/2014  | Roitshtein ............. H04L 45/748 709/213 |
| 2014/0341073 | A1  | 11/2014 | Abraham et al. |
| 2015/0131529 | A1* | 5/2015  | Zhou ..................... H04W 84/18 370/328 |

(Continued)

FOREIGN PATENT DOCUMENTS

| KR | 10-2012-0036844 | 4/2012 |
| KR | 10-2012-0120313 | 11/2012 |

*Primary Examiner* — Edward Urban
*Assistant Examiner* — Ralph H Justus
(74) *Attorney, Agent, or Firm* — The Farrell Law Firm, P.C.

(57) ABSTRACT

An electronic device is provided. The electronic device includes a short-range communication module for performing communication with one or more external electronic devices, a memory for storing a first attribute of a first cluster including the electronic device, and a processor for acquiring a message associated with a second cluster from a first external electronic device included in the second cluster through the short-range communication module, identifying a second attribute of the second cluster at least based on the acquired message, transmitting information corresponding to the first attribute to the first external electronic device through the short-range communication module when the second attribute satisfies a designated condition, and synchronizing the electronic device with the second cluster when the second attribute does not satisfy the designated condition.

20 Claims, 20 Drawing Sheets

(56) References Cited

U.S. PATENT DOCUMENTS

| | | | |
|---|---|---|---|
| 2015/0200811 A1* | 7/2015 | Kasslin | H04L 41/12 370/254 |
| 2015/0312819 A1* | 10/2015 | Yang | H04W 36/023 370/331 |
| 2015/0333846 A1* | 11/2015 | Morita | H04W 16/28 455/63.1 |
| 2016/0286476 A1* | 9/2016 | Patil | H04W 40/32 |
| 2017/0026282 A1* | 1/2017 | Huang | H04L 45/122 |

* cited by examiner

METHOD FOR SYNCHRONIZING PROXIMITY NETWORK AND ELECTRONIC DEVICE THEREOF

PRIORITY

This application claims priority under 35 U.S.C. § 119(a) to Korean Patent Application Serial No. 10-2015-0165253, which was filed in the Korean Intellectual Property Office on Nov. 25, 2015, the entire content of which is incorporated herein by reference.

BACKGROUND

1. Field of the Disclosure

The present disclosure relates to an apparatus and a method for synchronizing a proximity network, and more particularly, to an apparatus and a method for an electronic device for synchronizing with a cluster in a proximity network.

2. Description of the Related Art

Various types of proximity services using short-range wireless communication technology have been developed. Accordingly, physically adjacent electronic devices may quickly exchange data through a proximity network. For example, proximity services may include low-power proximity services using a Bluetooth low energy (BLE) beacon and low-power proximity services in neighbor awareness networking (NAN) specification based on a wireless local area network (WLAN).

SUMMARY

A proximity service may form a network which dynamically changes according to movement of an electronic device. For example, a low-power proximity service according to a NAN specification may form a set of electronic devices, which is referred to as a cluster.

In the low-power proximity service according to the NAN specification, electronic devices included in a cluster may transmit and receive a discovery signal (for example, a beacon) and a service discovery frame (SDF) within synchronized communication time duration (e.g., a discovery window). The electronic devices included in the cluster may maintain a low-power state (sleep state) in a period other than the synchronized time duration to reduce power consumption.

When a plurality of clusters overlap, the overlapping clusters may be merged into one cluster. For example, when an electronic device included in a first cluster receives proximity service data of a second cluster, the electronic device may compare cluster grades of the first cluster and the second cluster. When the second cluster has a higher cluster grade than the first cluster, the electronic device may synchronize with the second cluster. That is, electronic devices included in the first cluster may synchronize with the second cluster to be merged into the second cluster.

However, a cluster grade may have random values that are determined by a master electronic device in a corresponding cluster. Accordingly, when clusters are merged based on a cluster grade, the first cluster including a relatively large number of electronic devices may be merged into the second cluster including a relatively small number of electronic devices, according to a low cluster grade of the first cluster. In this case, a relatively large number of electronic devices synchronize with the second cluster, thus delaying a cluster merging time or increasing a communication disconnection time of the electronic devices included in the cluster.

An aspect of the present disclosure provides an apparatus and a method for efficiently merging clusters in a proximity network.

An aspect of the present disclosure provides an apparatus and a method for an electronic device to efficiently select a cluster to synchronize with among overlapping clusters.

In accordance with an aspect of the present disclosure, there is provided an electronic device. The electronic device includes a short-range communication module configured to perform communication with one or more external electronic devices, a memory configured to store a first attribute of a first cluster including the electronic device, and a processor configured to acquire a message associated with a second cluster from a first external electronic device included in the second cluster through the short-range communication module, to identify a second attribute of the second cluster at least based on the acquired message, to transmit information corresponding to the first attribute to the first external electronic device through the short-range communication module when the second attribute satisfies a designated condition, and to synchronize the electronic device with the second cluster when the second attribute does not satisfy the designated condition.

In accordance with an aspect of the present disclosure, there is provided an electronic device. The electronic device includes a short-range communication module configured to perform communication with one or more external electronic devices, a memory configured to store a first size of a first cluster including the electronic device, and a processor configured to acquire a message associated with a second cluster from a first external electronic device included in the second cluster through the short-range communication module, to identify a second size of the second cluster at least based on the acquired message, to maintain synchronization with the first cluster when the size of the first cluster is greater than the size of the second cluster, and to synchronize the electronic device to the second cluster when the size of the first cluster is less than or equal to the size of the second cluster.

In accordance with an aspect of the present disclosure, there is provided a method of an electronic device included in a first cluster having a first attribute. The method includes acquiring a message associated with a second cluster from a first external electronic device included in the second cluster, identifying a second attribute of the second cluster at least based on the acquired message, transmitting information corresponding to the first attribute to the first external electronic device when the second attribute satisfies a designated condition, and synchronizing the electronic device with the second cluster when the second attribute does not satisfy the designated condition.

In accordance with an aspect of the present disclosure, there is provided a method of an electronic device included in a first cluster having a first attribute. The method includes acquiring a message associated with a second cluster from a first external electronic device included in the second cluster, identifying a second size of the second cluster at least based on the acquired message, maintaining synchronization with the first cluster when a first size of the first cluster is greater than the second size of the second cluster, and synchronizing the electronic device to the second cluster when the first size of the first cluster is less than or equal to the second size of the second cluster.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION

Figure 1:
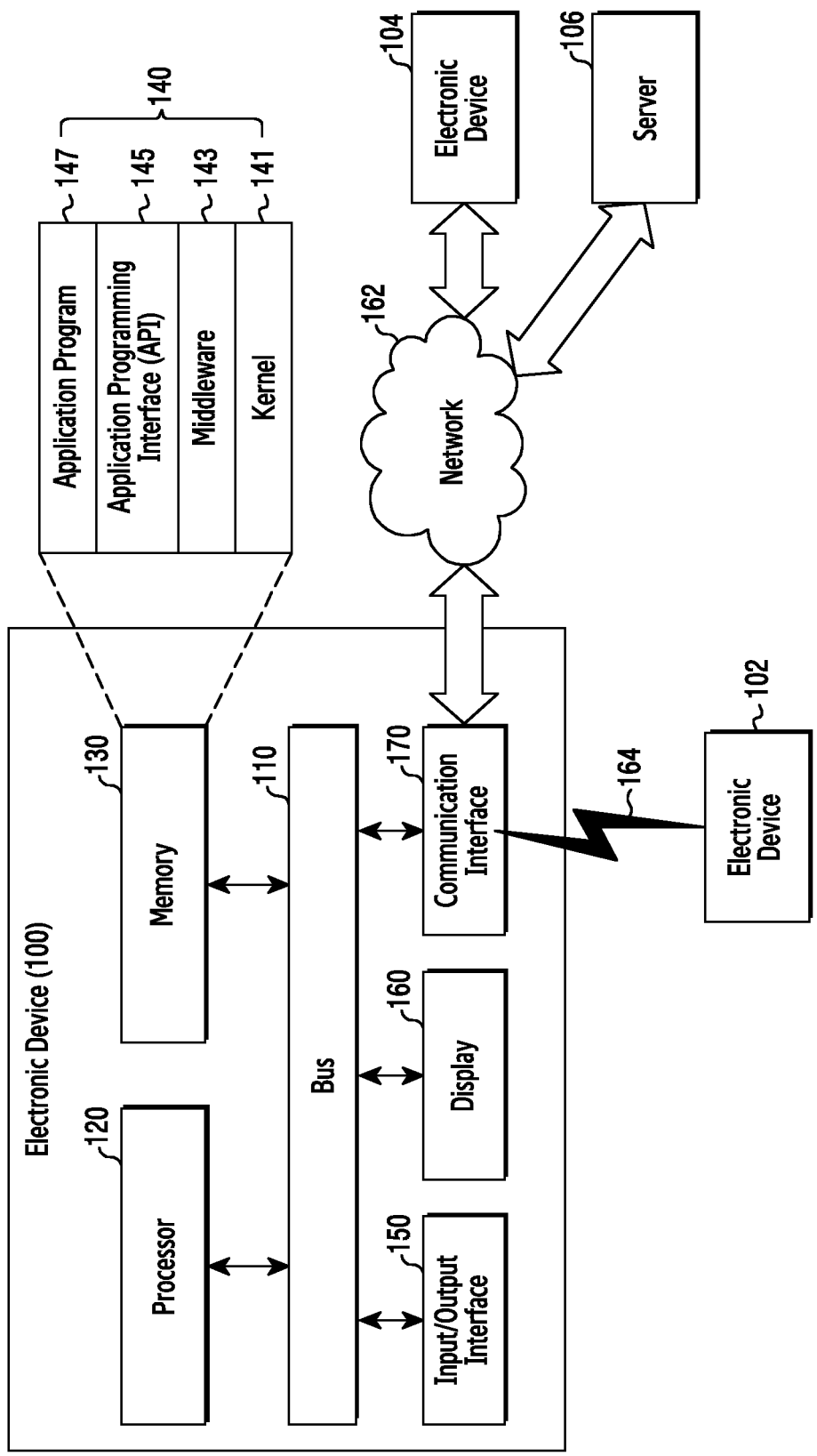
FIG. 1 is a diagram illustrating an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B. The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a diagram illustrating an electronic device, according to an embodiment of the present disclosure.

Referring to FIG. 1, the electronic device 100 includes a bus 110, a processor 120 (e.g., including processing circuitry), a memory 130, an input/output interface 150 (e.g., including input/output circuitry), a display 160 (e.g., including display circuitry), and a communication interface 170 (e.g., including communication circuitry). The electronic device 100 may omit at least one of the above elements or may further include other elements.

The bus 110 may include, for example, a circuit that interconnects the components 120 to 170 and delivers communication (for example, a control message and/or data) between the components 120 to 170.

The processor 120 may include one or more of a central processing units (CPU), an application processor (AP), and a communication processor (CP). For example, the processor 120 may carry out operations or data processing relating to control and/or communication of at least one other element of the electronic device 100.

The processor 120 may control an electronic device 100 to form a proximity network and to exchange data with other electronic devices belonging to a cluster in the proximity network through a synchronized communication period. For example, the proximity network may include a network for low-power proximity communication services in a neighbor awareness networking (NAN) specification. For example, the synchronized communication period may include a discovery window (DW) defined in the NAN specification. Hereinafter, the synchronized communication period in which the electronic device 100 is synchronized with the other electronic devices belonging to the cluster in the proximity network may be referred to as a "proximity network period."

The processor 120 may determine whether there is a different cluster that overlaps with or is adjacent to a cluster of the electronic device 100 through proximity service data received during the proximity network period. For example, when a synchronization (sync) beacon or discovery beacon is received from an electronic device in a different cluster, the processor 120 may determine that there is a different cluster overlapping with the cluster of the electronic device 100. For example, when a beacon or probe response signal is received from an access point (AP) or a Wi-Fi director agent (group owner), the processor 120 may determine through a cluster discovery attribute of the received beacon whether there is a different cluster that overlaps with or is adjacent to the cluster of the electronic device 100.

When there is a different cluster that overlaps with or is adjacent to the cluster of the electronic device 100, the processor 120 may determine clusters to synchronize with based on cluster attributes. For example, the cluster attributes may include at least one of the number of electronic devices included in a cluster, a total hop count of an electronic device forming a cluster, the number of services provided by a cluster, and a security level of a cluster.

When there is a different cluster that overlaps with or is adjacent to the cluster of the electronic device 100, the processor 120 may synchronize with a cluster including a greater number of electronic devices. For example, when the cluster of the electronic device 100 includes a greater number of electronic devices than the different cluster, the processor 120 may maintain synchronization with the cluster of the electronic device 100. For example, when the cluster of the electronic device 100 includes a smaller number of electronic devices than the different cluster, the processor 120 may control the communication interface 170 to synchronize with the different cluster. That is, the cluster of the electronic device 100 may be merged with the different cluster.

When there is a different cluster that overlaps with or is adjacent to the cluster of the electronic device 100, the processor 120 may synchronize with a cluster including an electronic device having a greater total hop count. For example, when a total hop count of the cluster of the electronic device 100 is greater than that of the different cluster, the processor 120 may maintain synchronization with the cluster of the electronic device 100. For example, when the total hop count of the cluster of the electronic device 100 is smaller than that of the different cluster, the processor 120 may control the communication interface 170 to synchronize with the different cluster. That is, the cluster of the electronic device 100 may be merged with the different cluster.

When there is a different cluster that overlaps with or is adjacent to the cluster of the electronic device 100, the processor 120 may synchronize with a cluster providing a greater number of services. For example, when the cluster of the electronic device 100 provides a greater number of services than the different cluster, the processor 120 may maintain synchronization with the cluster of the electronic device 100. For example, when the cluster of the electronic device 100 provides a smaller number of services than the different cluster, the processor 120 may control the communication interface 170 to synchronize with the different cluster. That is, the cluster of the electronic device 100 may be merged with the different cluster.

When there is a different cluster that overlaps with or is adjacent to the cluster of the electronic device 100, the processor 120 may selectively merge clusters according to security levels of clusters. For example, when the cluster of the electronic device 100 has a security level set higher than a threshold level, the processor 120 may determine that a personal mode is set for the cluster of the electronic device 100. Accordingly, the processor 120 may restrict merging of the cluster.

The memory 130 may include a volatile memory and/or a non-volatile memory. The memory 130 may store, for example, instructions or data (e.g., a reference size and reference level) related to at least one other component. The memory 130 may store software and/or a program 140. For example, the program may include a kernel 141, a middleware 143, an Application Programming Interface API 145, an application program (or application) 147, or the like. At least some of the kernel 141, the middleware 143, and the API 145 may be referred to as an operating system (OS).

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 100 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 100, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as an interface that transfers instructions or data input from a user or another external device to the other element(s) of the electronic device 100. Furthermore, the input/output interface 150 may output the instructions or data received from the other element(s) of the electronic device 100 to the user or another external device.

The display 160 may include, for example, a liquid crystal display (LCD), a light-emitting diode (LED) display, an organic light-emitting diode (OLED) display, a microelectromechanical systems (MEMS) display, and an electronic paper display. The display 160 may display various types of contents (for example, text, images, videos, icons, or symbols) for the user. The display 160 may include a touch screen and may receive, for example, a touch, gesture, proximity, or hovering input by using an electronic pen or the user's body part.

The communication interface 170 may set communication between the electronic device 100 and an external device (for example, a first external electronic device 102, a second external electronic device 104, or a server 106). For example, the communication interface 170 may be connected to a network 162 through wireless or wired communication to communicate with the second external electronic device 104 or the server 106.

The wireless communication may use at least one of, for example, long term evolution (LTE), LTE-advance (LTE-A), code division multiple access (CDMA), wideband CDMA (WCDMA), universal mobile telecommunications system (UMTS), WiBro (Wireless Broadband), and global system for mobile communications (GSM), as a cellular communication protocol. Further, the wireless communication may include, for example, short-range communication 164. The short-range communication may include at least one of, for example, Wi-Fi, Bluetooth, near field communication (NFC), and global navigation satellite system (GNSS). The GNSS may include at least one of, for example, a global positioning system (GPS), Glonass, Beidou, and Galileo, according to a use area, a bandwidth, or the like. Hereinafter, in the present disclosure, the "GPS" may be interchangeably used with the "GNSS". The wired communication may include, for example, at least one of a universal serial bus (USB), a high definition multimedia interface (HDMI), recommended standard-232 (RS-232, and a plain old telephone service (POTS). The network 162 may include at least one of a communication network such as a computer network (e.g., a LAN or a WAN), the Internet, and a telephone network.

The electronic device 100 may provide service using a proximity network through at least one of module that is different from processor 120.

Each of the first and second external electronic devices 102 and 104 may be a device which is the same as or different from the electronic device 100. The server 106 may include a group of one or more servers. All or some of the operations performed in the electronic device 100 may be performed in another electronic device or the electronic devices 102 and 104 or the server 106. When the electronic device 100 has to perform some functions or services automatically or in response to a request, the electronic device 100 may make a request for performing at least some functions relating thereto to the electronic device 102 or 104 or the server 106 instead of performing the functions or services by itself or in addition. The electronic device 102 or 104, or the server 106 may execute the requested functions or the additional functions, and may deliver a result of the execution to the electronic device 100. The electronic device 100 may process the received result as it is or additionally to provide the requested functions or services. To achieve this, for example, cloud computing, distributed computing, or client-server computing technology may be used.

Figure 2:
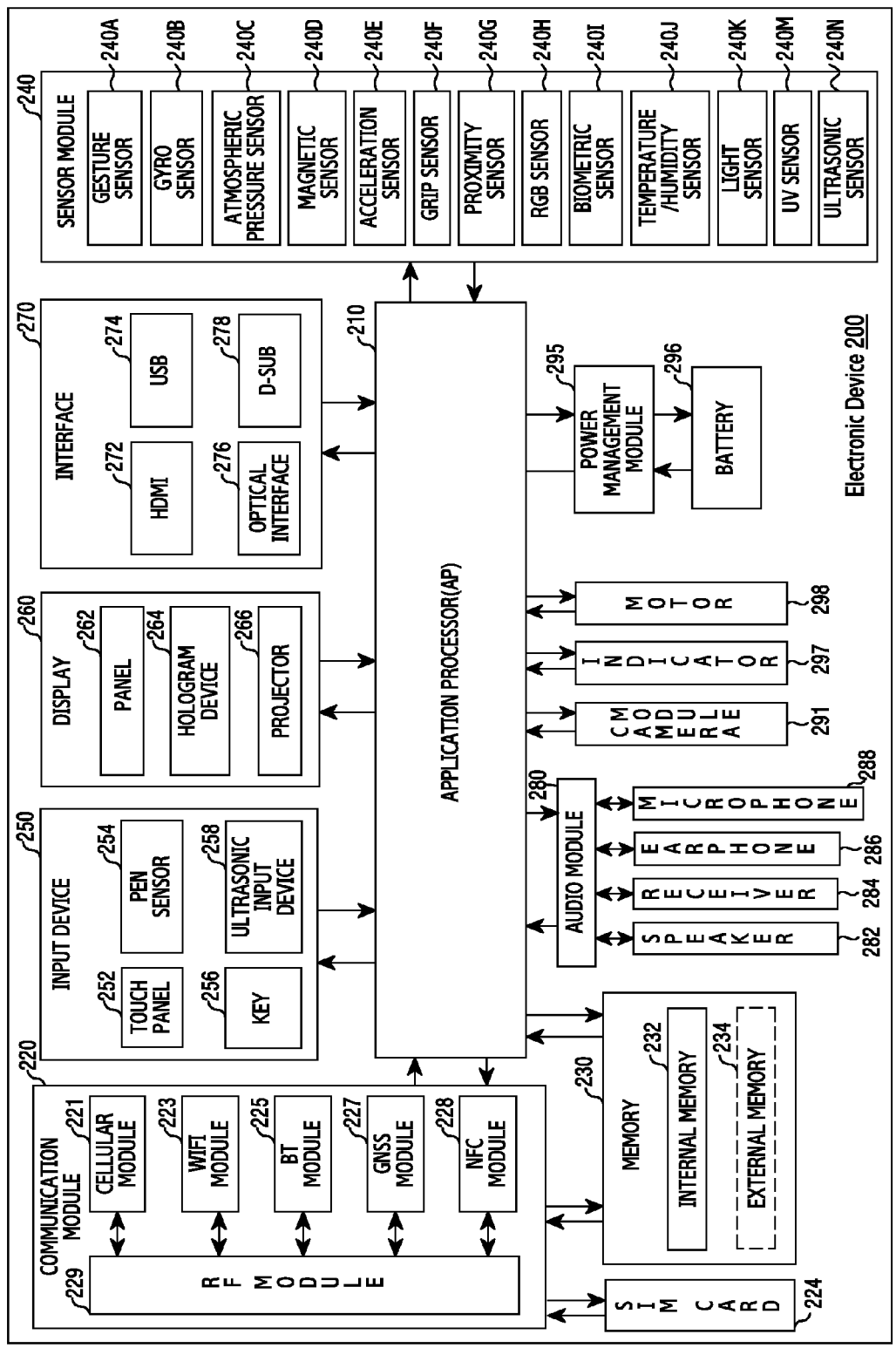
FIG. 2 is a diagram illustrating an electronic device, according to an embodiment of the present disclosure.

FIG. 2 is a diagram illustrating an electronic device, according to an embodiment of the present disclosure. In the following description, the electronic device 200 may be, for example, the entire electronic device 100 illustrated in FIG. 1 or part of the electronic device 100.

Referring to FIG. 2, the electronic device 200 include one or more processors (for example, an AP) 210, a communication module 220, a subscriber identity module (SIM) 224, a memory 230, a sensor module 240, an input device 250, a display 260, an interface 270, an audio module 280, a camera module 291, a power management module 295, a battery 296, an indicator 297, and a motor 298.

The processor 210 may run, for example, an operating system (OS) or application program to control a plurality of hardware or software components connected to the processors 210 and may perform various kinds of data processing and operations. The processors 210 may be configured, for example, as a system on chip (SoC). The processors 210 may further include a graphic processing unit (GPU) and/or an image signal processor. The processors 210 may include at least part (for example, a cellular module 221) of the components illustrated in FIG. 2. The processors 210 may load a command or data received from at least one of other components (for example, a nonvolatile memory) into a volatile memory to process the command or data and may store various kinds of data in the nonvolatile memory.

The communication module 220 may have a configuration that is the same as or similar to that of the communication interface 170 in FIG. 1. The communication module 220 includes, for example, a cellular module 221, a Wi-Fi module 223, a Bluetooth module 225, a GNSS module 227 (e.g., a GPS module, a Glonass module, a Beidou module, or a Galileo module), a NFC module 228, and a radio frequency (RF) module 229.

The cellular module 221 may provide, for example, a voice call, a video call, a text messaging service, or an Internet service through a communication network. The cellular module 221 may perform identification and authentication of the electronic device 200 in a communication network using the SIM card 224. The cellular module 221 may perform at least part of functions provided by the processors 210. The cellular module 221 may include a communication processor (CP).

The Wi-Fi module 223, the Bluetooth module 225, the GNSS module 227, and the NFC module 228 may each include a processor to process data transmitted and received via the respective modules. At least part (for example, two or more) of the cellular module 221, the Wi-Fi module 223, the Bluetooth module 225, the GNSS module 227, and the NFC module 228 may be included in one integrated chip (IC) or IC package.

The RF module 229 may transmit and receive, for example, an RF signal. The RF module 229 may include, for example, a transceiver, a power amplifier (amp) module (PAM), a frequency filter, a low noise amplifier (LNA), an antenna, or the like. At least one of the cellular module 221, the Wi-Fi module 223, the Bluetooth module 225, the GNSS module 227, and the NFC module 228 may transmit and receive an RF signal through a separate RF module.

The SIM 224 may be an embedded SIM and may include unique identification information (for example, an integrated circuit card identifier (ICCID)) or subscriber information (for example, an international mobile subscriber identity (IMSI)).

The memory 230 may include, for example, an internal memory 232 or an external memory 234. The internal memory 232 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and a programmable ROM (EEPROM), a mask ROM, a flash ROM, a flash memory (for example, an NAND flash, an NOR flash, or the like), a hard drive, or a solid state drive (SSD)).

The external memory 234 may further include a flash drive, for example, a compact flash (CF), a secure digital (SD), a micro secure digital (micro-SD), a mini secure digital (mini-SD), an extreme digital (xD), a multi-media card (MMC), a memory stick, or the like. The external memory 234 may be functionally and/or physically connected to the electronic device 200 through various interfaces.

The sensor module 240 may measure, for example, physical quantities or detect an operation state of the electronic device 200 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G a color sensor 240H (for example, a red, green, and blue (RGB) sensor), a biometric sensor 240I, a temperature/humidity sensor 240J, a illumination sensor 240K, a ultraviolet (UV) sensor 240L, and a galvanic skin reflex (GRS) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. The electronic device 200 may further include a processor configured, as a part of the processors 210 or separately from the processors 210, to control the sensor module 240, thereby controlling the sensor module 240 while the processors 210 is in a sleep state.

The input device 250 may include, for example, a touch panel 252, a (digital) pen sensor 254, a key 256, or an ultrasonic input device 258. The touch panel 252 may use, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or include a separate recognition sheet. The key 256 may include, for example, a physical button, an optical key, or a keypad. The ultrasonic device 258 may detect ultrasonic waves generated in an input tool through a microphone 288 and identify data corresponding to the detected ultrasonic waves.

The display 260 may include a panel 262, a hologram device 264, or a projector 266. The panel 262 may include a configuration that is the same as or similar to that of the display 160 of FIG. 1. The panel 262 may be configured, for example, to be flexible, transparent, or wearable. The panel 262 may be formed with the touch panel 252 in a single module. The panel 262 may include a pressure sensor (or force sensor) to measure the strength of pressure by a user touch. The pressure sensor may be configured in an integrated form with the touch panel 252 or be configured as one or more sensors separate from the touch panel 252. The hologram device 264 may display a three-dimensional image in the air using the interference of light. The projector 266 may project light onto a screen to display an image. The screen may be disposed, for example, inside or outside the electronic device 200. The display 260 may further include a control circuit to control the panel 262, the hologram device 264, or the projector 266.

The interface 270 may include, for example, a high-definition multimedia interface (HDMI) 272, a universal serial bus (USB) 274, an optical interface 276, or a d-sub-miniature (D-sub) 278. The interface 270 may be included, for example, in the communication interface 170 illustrated in FIG. 1. Additionally or alternatively, the interface 270 may include, for example, a mobile high-definition link (MHL) interface, an SD card/MMC interface, or an infrared data association (IrDA) interface.

The audio module 280 may convert, for example, a sound and an electrical signal reciprocally. At least some components of the audio module 280 may be included, for example, in an input/output interface 150 illustrated in FIG. 1. The audio module 280 may process sound information input or output, for example, through a speaker 282, a receiver 284, earphones 286, or the microphone 288.

The camera module 291 is a device that takes, for example, a still image and a video. The camera module 291 may include one or more image sensors (for example, a front sensor or a rear sensor), a lens, an image signal processor (ISP), or a flash (for example, a light emitting diode (LED), a xenon lamp, or the like).

The power management module 295 may manage, for example, the power of the electronic device 200. The power management module 295 may include a power management integrated circuit (PMIC), a charger integrated circuit (IC), or a battery gauge. The power management module 295 may be supplied with power from the outside via a cable and/or wirelessly. For example, the power management module 295 may be supplied with power from the outside using a wireless charging method, such as a magnetic resonance method, a magnetic induction method, or an electromagnetic wave method. The power management module 295 may further include an additional circuit, such as a coil loop, a resonance circuit, or a rectifier, to be supplied with power wirelessly. The battery gauge may measure, for example, the remaining battery charge, the charging voltage, the current, or temperature of the battery 296.

The battery 296 may include, for example, a rechargeable battery and/or a solar battery. The battery 296 may include a plurality of cells connectable in series or in parallel.

The indicator 297 may display a specific state of the electronic device 200 or a component thereof (for example, the processors 210), for example, a booting state, a message state, or a charging state. The motor 298 may convert an electrical signal into mechanical vibrations and may generate vibrations or a haptic effect. Although not shown, the electronic device 200 may include a processing device for supporting a mobile TV (for example, a GPU). The processing device for supporting the mobile TV may process media data in accordance with digital multimedia broadcasting (DMB), digital video broadcasting (DVB), or mediaFlo™ standards.

Each of the above-described component elements of hardware according may be configured with one or more components, and the names of the corresponding component elements may vary based on the type of electronic device. The electronic device may include at least one of the aforementioned elements. Some elements may be omitted or other additional elements may be further included in the electronic device. Also, some of the hardware components may be combined into one entity, which may perform functions identical to those of the relevant components before the combination.

Figure 3:
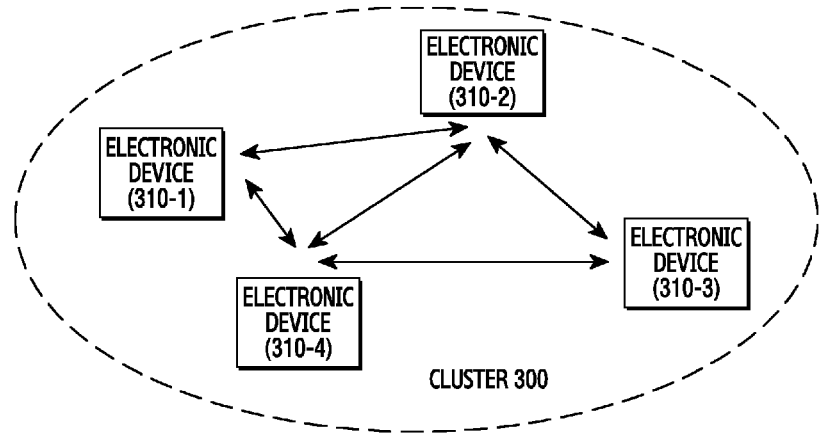
FIG. 3 is a diagram illustrating a cluster for a proximity network, according to an embodiment of the present disclosure.

FIG. 3 is a diagram illustrating a cluster for a proximity network, according to an embodiment of the present disclosure. In the following description, the cluster 300 refers to a set of electronic devices that form the proximity network to mutually transmit and receive data. For example, the cluster 300 may be referred to as an NAN cluster according to the NAN specification.

Referring to FIG. 3, a plurality of electronic devices 310-1, 310-2, 310-3, and 310-4 may form one cluster.

The electronic devices 310-1, 310-2, 310-3, and 310-4 included in the cluster 300 may transmit and receive a beacon and a service discovery frame in a synchronized proximity network period (DW). The electronic devices 310-1, 310-2, 310-3, and 310-4 may maintain the sleep state in an interval between the proximity network periods. For example, the electronic devices 310-1, 310-2, 310-3, and 310-4 included in the cluster 300 may perform discovery, synchronization, and data exchange operations using a protocol illustrated below in FIG. 4.

Figure 4:
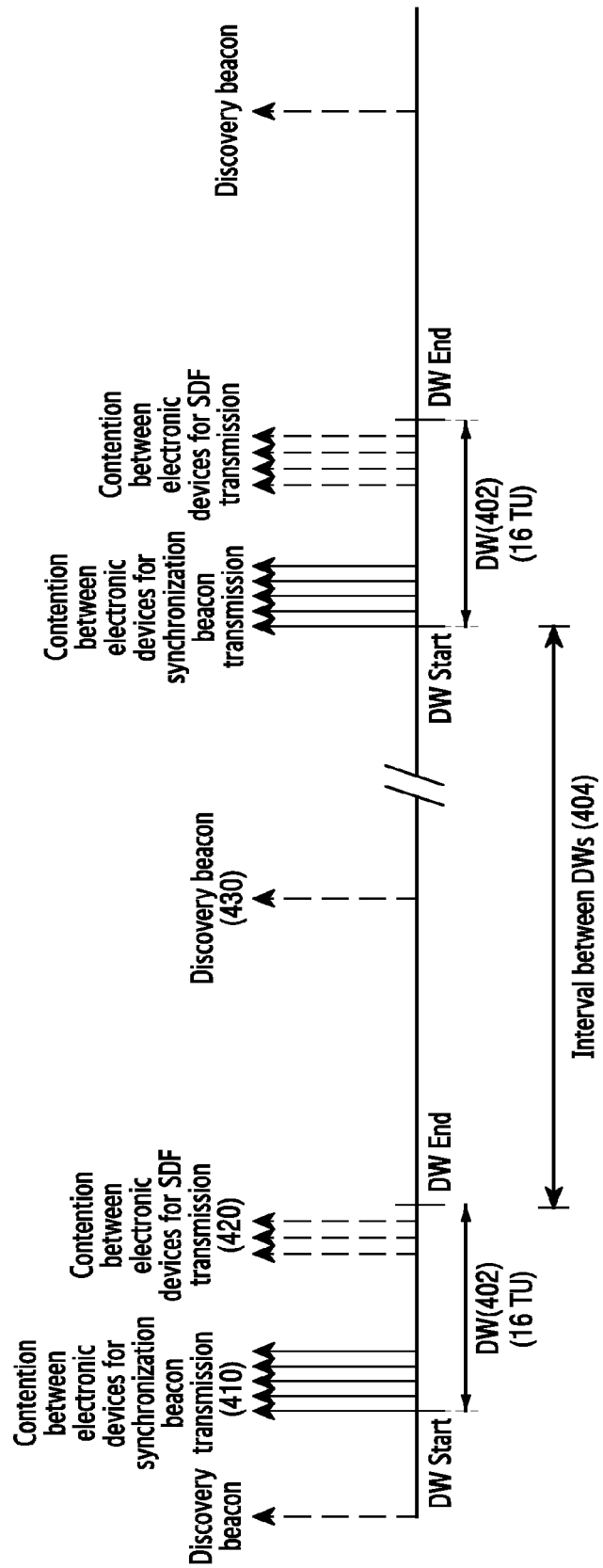
FIG. 4 is a diagram illustrating a protocol for signal transmission in a proximity network, according to an embodiment of the present disclosure.

FIG. 4 is a diagram illustrating a protocol for signal transmission in a proximity network, according to an embodiment of the present disclosure. The following description is made with reference to an example in which electronic devices included in one cluster transmit a signal through a specific channel (for example, channel 6) based on the NAN specification.

Referring to FIG. 4, the electronic devices may transmit a synchronization beacon 410 and a service discovery frame (SDF) 420 in a synchronized proximity network period or discovery window (DW) 402. A discovery beacon 430 may be transmitted by at least one electronic device in an interval 404 between the DWs. For example, the electronic devices may transmit the synchronization beacon 410 and the SDF 420 based on contention. For example, the DW 402 may occupy 16 time units and may be present at intervals of 512 time units based on the NAN specification.

The discovery beacon 430 is a signal transmitted for a different electronic device, which does not join the cluster, to discover the cluster. For example, electronic devices that do not join a first cluster perform passive scanning to detect a discovery beacon 430, thereby discovering and joining the first cluster.

The discovery beacon 430 may include any necessary information for synchronization with the cluster. For example, the discovery beacon 430 may include at least one of a frame control (FC) field indicating a signal function (for example, a beacon), a broadcast address, a media access control (MAC) address of a transmitting electronic device, a cluster identifier, a sequence control field, a time stamp for a beacon frame, a beacon interval field indicating a transmission interval of the discovery beacon 430, and capability information on the transmitting electronic device. The discovery beacon 430 may include an information element relevant to at least one proximity network. Here, the proximity network relevant information may be referred to as attribute information.

The synchronization beacon 410 is a signal for maintaining synchronization between the synchronized electronic devices in the cluster. For example, the synchronization beacon 410 may be transmitted by a synchronization device from among the electronic devices in the cluster. For example, the synchronization device may include an anchor master device, a master device, and a non-master sync device defined in the NAN specification.

The synchronization beacon 410 may include necessary information for synchronization between the electronic devices in the cluster. For example, the synchronization beacon 410 may include at least one of an FC field indicating a signal function, a broadcast address, an MAC address of a transmitting electronic device, a cluster identifier, a sequence control field, a time stamp for a beacon frame, a beacon interval field indicating an interval between the start points of the DWs 402, and capability information on the transmitting electronic device. The synchronization beacon 410 may include an information element that is relevant to at least one proximity network. Here, proximity network relevant information may include content for a service provided through the proximity network.

The SDF 420 is a signal for data exchanges through the proximity network. The SDF 420 is a vendor-specific public action frame and may include various fields. For example, the SDF 420 may include category and action fields and may include relevant information on at least one proximity network.

As described above, the synchronization beacon 410, the SDF 420, and the discovery beacon 430 may include relevant information on the proximity network. The relevant information on the proximity network may include, but is not limited to, an identifier indicating an information type, the length of information, and a body field as corresponding information. For example, the corresponding information included in the relevant information on the proximity network may include at least one of master indication information, cluster information, service identifier list information, service description information, connection capability information, WLAN infrastructure information, peer-to-peer (P2P) operation information, independent basic service set (IBSS) information, mesh information, additional proximity network service discovery information, further availability map information, country code information, ranging information, cluster discovery information, and vendor-specific information.

Figure 5:
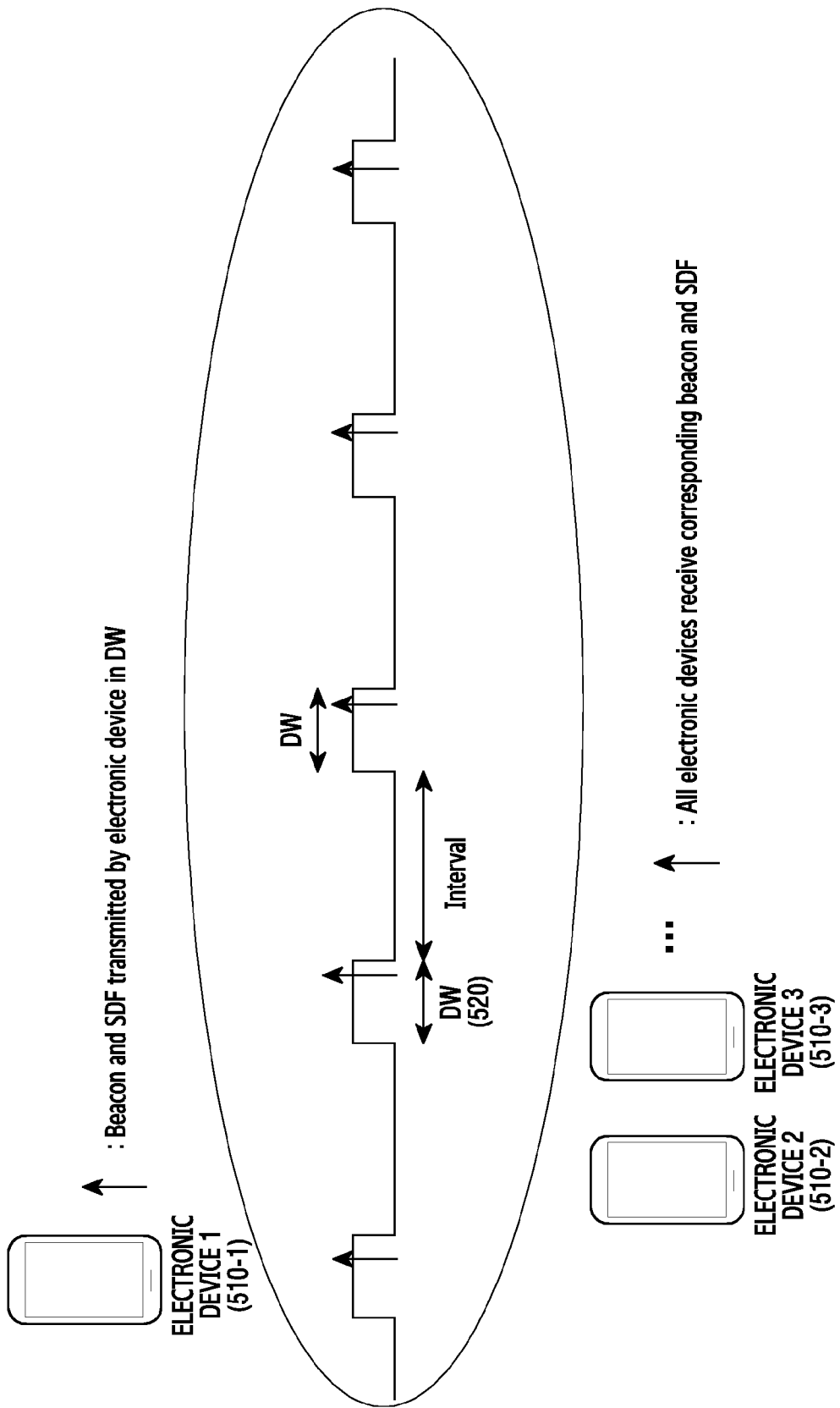
FIG. 5 is a diagram illustrating data transmission and reception in a proximity network, according to an embodiment of the present disclosure.

FIG. 5 is a diagram illustrating a data transmission and a reception in a proximity network, according to an embodiment of the present disclosure. In the following description, one (for example, electronic device 1 510-1) of electronic devices that forms a cluster may serve as a master electronic device or an anchor master electronic device.

Referring to FIG. 5, the electronic device 1 510-1 may transmit a beacon and an SDF in a proximity network period DW 520. Electronic device 2 510-2 and electronic device 3 510-3 may receive the beacon and the SDF transmitted by electronic device 1 510-1. Here, the beacon transmitted in the DW is a synchronization beacon and may include information for maintaining synchronization between the electronic devices 510-1 to 510-3.

In an interval between the DWs, the electronic devices 510-1 to 510-3 may maintain the sleep state to reduce power consumption. For example, the electronic devices 510-1 to 510-3 may operate in a wake-up state only in the DW based on a synchronized time clock, thereby reducing power consumption.

Figure 6A:
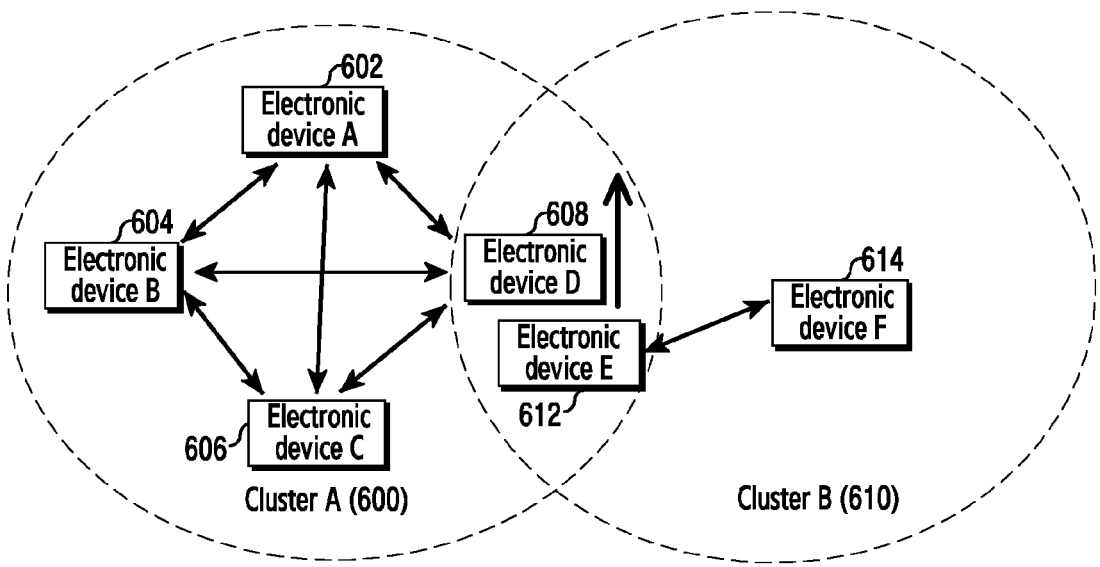
FIGS. 6A and 6B are diagrams illustrating cluster merging in a proximity network, according to an embodiment of the present disclosure.
Figure 6B:
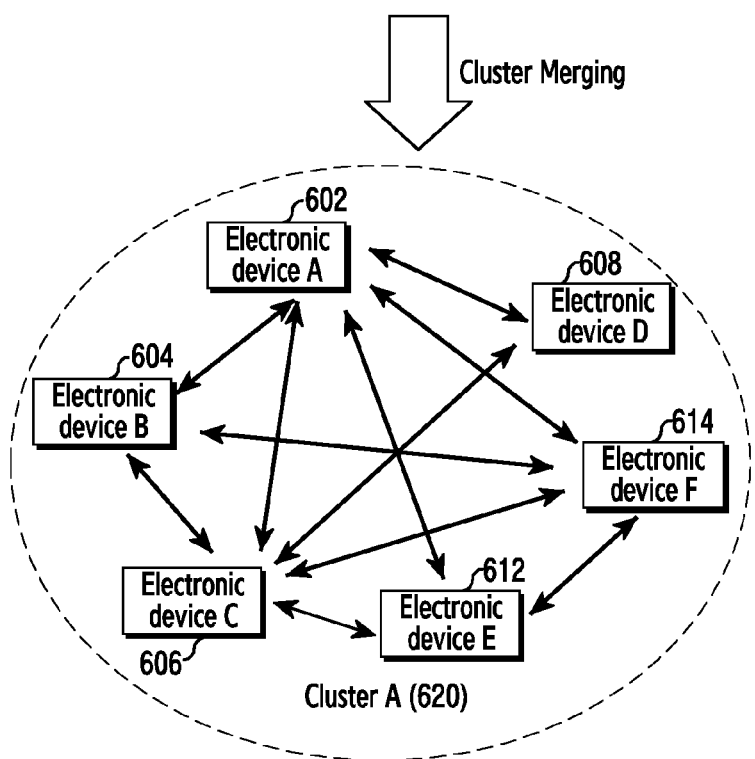

FIGS. 6A and 6B are diagrams illustrating cluster merging in a proximity network, according to an embodiment of the present disclosure.

As illustrated in FIG. 6A, a cluster A 600 may be formed to include electronic devices 602, 604, 606, and 608, and cluster B 610 may be formed to include electronic devices 612 and 614.

When cluster A 600 and cluster B 610 at least partly overlap, as illustrated in FIG. 6B, cluster A 600 and cluster B 610 may merge into one cluster (for example, cluster A 620) based on a cluster attribute (for example, cluster size). For example, the ranges of cluster A 600 and cluster B 610 may be changed by movement of at least one synchronized electronic device in each cluster. Accordingly, cluster A 600 and cluster B 610, although the clusters had not been adjacent, may overlap or become adjacent. For example, when the signal intensity of at least one synchronized electronic device in each cluster is changed, the ranges of cluster A 600 and cluster B 610 may be changed. Accordingly, cluster A 600 and cluster B 610, although the clusters are not been adjacent, may overlap or become adjacent.

For example, when electronic device D 608 in cluster A 600 receives proximity service data of cluster B 610, electronic device D 608 may determine that cluster B 610 may overlap with or be adjacent to cluster A 600. Electronic device D 608 may compare the sizes of cluster A 600 and cluster B 610 to select a cluster to synchronize with. For example, when electronic device D 608 determines that the size of cluster A 600 is greater, as illustrated in FIG. 6B, electronic device D 608 may maintain synchronization with cluster A 600. For example, the proximity service data may include at least one of a beacon and an SDF.

For example, when electronic device E 612 in cluster B 610 receives proximity service data of cluster A 600, electronic device E 612 may determine that cluster A 600 may overlap with or be adjacent to cluster B 610. Electronic device E 612 may compare the sizes of cluster A 600 and cluster B 610 to select a cluster to synchronize with. For example, when electronic device E 612 determines that cluster A 600 is greater in size, as illustrated in FIG. 6B, electronic device E 612 may synchronize with cluster A 600.

An electronic device may include a short-range communication module configured to perform communication with one or more external electronic devices; a memory configured to store a first attribute of a first cluster including the electronic device; and a processor, wherein the processor may be configured to acquire a message associated with a second cluster from an external electronic device included in the second cluster through the short-range communication module, to identify a second attribute of the second cluster at least based on the message, to transmit information corresponding to the first attribute to the external electronic device through the short-range communication module when the second attribute satisfies a designated condition, and to synchronize the electronic device with the second cluster when the second attribute does not satisfy the designated condition.

The first cluster may include a different external electronic device, and the processor may be configured to broadcast a different message including the second attribute to the different external electronic device through the short-range communication module.

The first attribute may include a first size of the first cluster, the second attribute may include a second size of the second cluster, and the processor may be configured to compare the second size with the first size and to determine whether the second attribute satisfies the designated condition.

The first size may be determined according to a number of electronic devices included in the first cluster, a number of hops of the electronic devices included in the first cluster, a number of services provided by the electronic devices synchronized with the first cluster, a security level set for the first cluster, or a combination thereof, and the second size may be determined according to a number of electronic devices included in the second cluster, a number of hops of the electronic devices included in the second cluster, a number of services provided by the electronic devices synchronized with the second cluster, a security level set for the second cluster, or a combination thereof.

The processor may be configured to estimate the number of the electronic devices included in the first cluster based on a control parameter of a service response filter.

The second cluster may be synchronized with a third cluster, and the second attribute may include a maximum number of hops included in the second cluster and the third cluster.

The first cluster and the second cluster may include at least one of an NAN and a low-power local area network.

An electronic device may include a short-range communication module configured to perform communication with one or more external electronic devices; a memory configured to store a first size of a first cluster including the electronic device; and a processor, wherein the processor may be configured to acquire a message associated with a second cluster from an external electronic device included in the second cluster through the short-range communication module, to identify a second size of the second cluster at least based on the message, to maintain synchronization with the first cluster when the size of the first cluster is greater than the size of the second cluster, and to synchronize the electronic device to the second cluster when the size of the first cluster is the size of the second cluster or smaller.

The first size may be determined according to a number of electronic devices included in the first cluster, a number of hops of the electronic devices included in the first cluster, a number of services provided by the electronic devices synchronized with the first cluster, a security level set for the first cluster, or a combination thereof, and the second size may be determined according to a number of electronic devices included in the second cluster, a number of hops of the electronic devices included in the second cluster, a number of services provided by the electronic devices synchronized with the second cluster, a security level set for the second cluster, or a combination thereof.

The first cluster may include a different external electronic device, and the processor may be configured to broadcast a different message including the second size to the different external electronic device through the short-range communication module and to synchronize with the second cluster.

The first cluster and the second cluster may include at least one of an NAN and a low-power local area network.

Figure 7A:
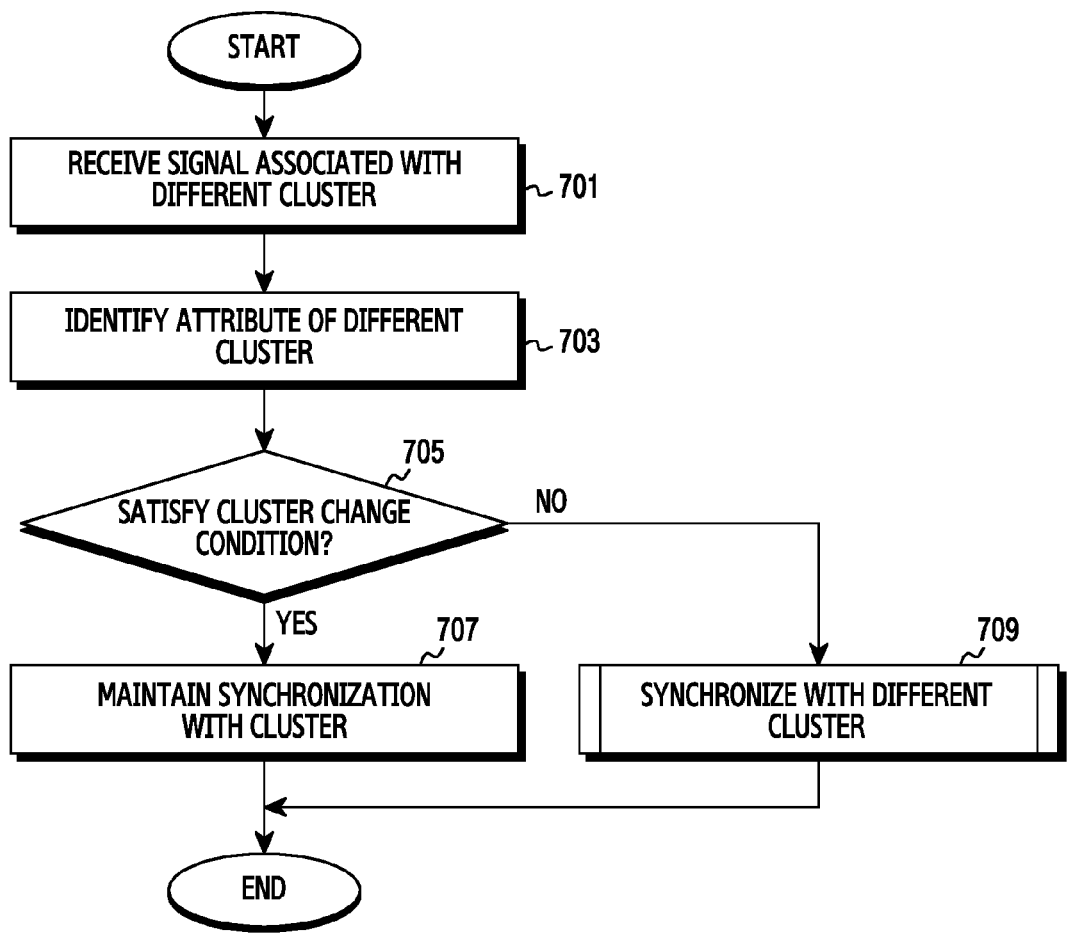
FIG. 7A is a flowchart of a method used by an electronic device for merging a cluster, according to an embodiment of the present disclosure.

FIG. 7A is a flowchart of a method used by an electronic device for merging a cluster, according to an embodiment of the present disclosure. In the following description, the electronic device may be the entire electronic device 100 illustrated in FIG. 1 or part of the electronic device 100 (for example, the processor 120).

Referring to FIG. 7A, the electronic device may receive a signal associated with a different cluster in operation 701. For example, as illustrated in FIGS. 6A and 6B, when the electronic device 100 synchronizes with cluster A 600, the processor 120 determines whether proximity network data on the different cluster (for example, cluster B 610) that overlaps with or is adjacent to cluster A 600 is received. When the proximity network data on the different cluster is received, the processor 120 may determine that the different cluster is adjacent to or overlaps with the cluster of the electronic device 100. For example, the processor 120 may identify the proximity network data on the different cluster through a cluster identifier (ID) included in the proximity network data.

The electronic device may identify an attribute of the different cluster through the proximity network data received from the different cluster in operation 703. For example, the processor 120 may identify the attribute of the different cluster through a beacon or SDF received from a different electronic device included in the different cluster. For example, the attribute of the cluster may include at least one of the number of electronic devices included in the cluster, a total hop count of an electronic device forming the cluster, the number of services provided by the cluster, and the security level of the cluster.

The electronic device may determine whether the attribute of the different cluster satisfies a cluster change condition in operation 705. For example, the processor 120 may compare the size of the cluster of the electronic device 100 and the size of the different cluster. When the size of the different cluster is greater than the size of the cluster of the electronic device 100, the processor 120 may determine that the attribute of the different cluster satisfies the cluster change condition.

When the attribute of the different cluster does not satisfy the cluster change condition, the electronic device may maintain synchronization with the cluster of the electronic device 100 in operation 707. For example, when the size of the cluster of the electronic device 100 is greater than the size of the different cluster, the processor 120 may maintain synchronization with the cluster of the electronic device 100.

When the attribute of the different cluster satisfies the cluster change condition, the electronic device may synchronize with the different cluster in operation 709. For example, when the size of the cluster of the electronic device 100 is smaller than the size of the different cluster, the processor 120 may synchronize with the different cluster. That is, the cluster of the electronic device 100 may be merged into the different cluster. Additionally or alternatively, when the electronic device 100 is a synchronization device, the processor 120 may transmit a synchronization beacon of the different cluster to the cluster of the electronic device 100 before synchronizing with the different cluster.

Figure 7B:
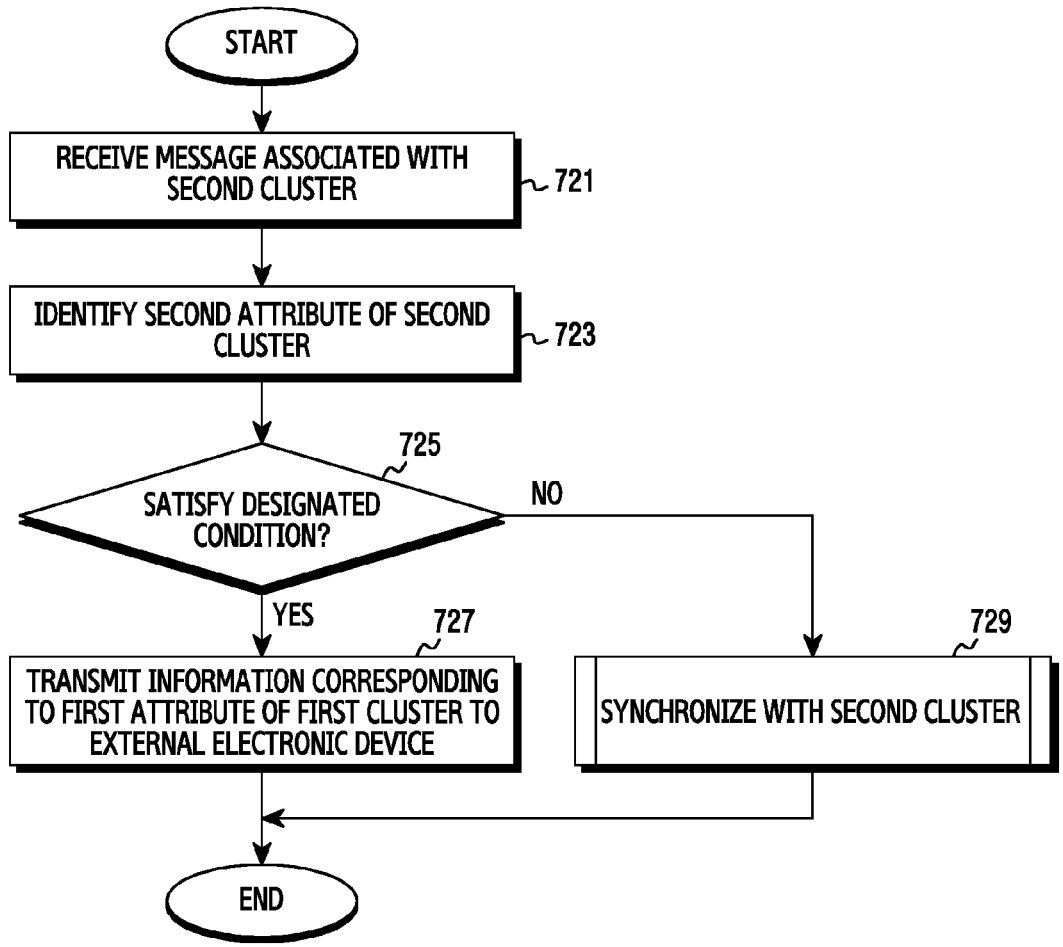
FIG. 7B is a flowchart of a method used by an electronic device for merging a cluster, according to an embodiments of the present disclosure.

FIG. 7B is a flowchart of a method used by an electronic device for merging a cluster, according to an embodiments of the present disclosure. In the following description, the electronic device may be the entire electronic device 100 illustrated in FIG. 1 or part of the electronic device 100 (for example, the processor 120).

Referring to FIG. 7B, the electronic device included in a first cluster having a first attribute may acquire a message associated with a second cluster from an external electronic device included in the second cluster in operation 721. For example, as illustrated in FIGS. 6A and 6B, when the electronic device 100 synchronizes with cluster A 600, the processor 120 may acquire proximity network data on cluster B 610.

The electronic device may identify a second attribute of the second cluster through the message acquired from the second cluster in operation 723. For example, the attribute of the cluster may include at least one of the number of electronic devices included in the cluster, a total hop count of an electronic device forming the cluster, the number of services provided by the cluster, and the security level of the cluster.

The electronic device may determine whether the second attribute of the second cluster satisfies a designated condition in operation 725. For example, the processor 120 may determine whether the second attribute of the second cluster satisfies a cluster change condition.

When the second attribute of the second cluster satisfies the designated condition, the electronic device may transmit information corresponding to the first attribute of the first cluster to the external electronic device included in the second cluster in operation 727. For example, the processor 120 may control the communication interface 170 to transmit a synchronization signal of the first cluster to the external electronic device included in the second cluster.

When the second attribute of the second cluster does not satisfy the designated condition, the electronic device may synchronize with the second cluster in operation 729. For example, the first cluster may be merged into the second cluster.

Figure 8:
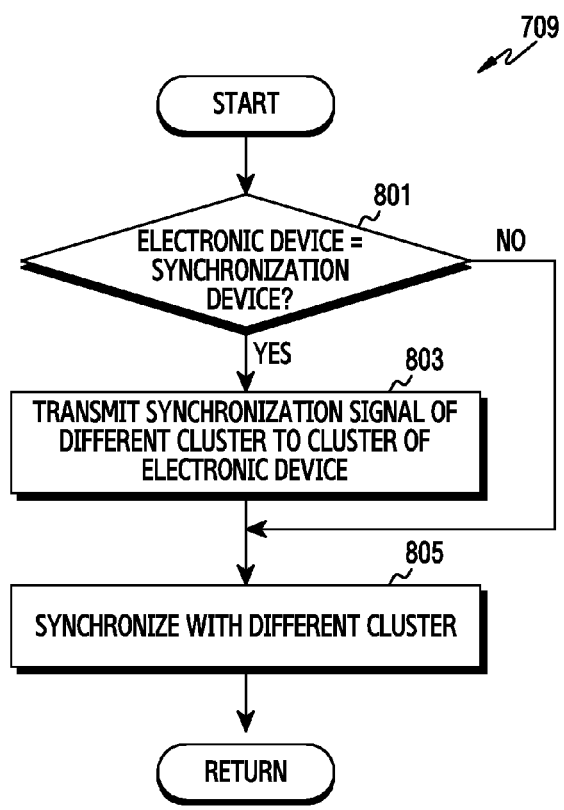
FIG. 8 is a flowchart of a method used by an electronic device for synchronizing with a different cluster, according to an embodiment of the present disclosure.

FIG. 8 is a flowchart of a method used by an electronic device for synchronizing with a different cluster, according to an embodiment of the present disclosure. In the following description, the electronic device may be the entire electronic device 100 illustrated in FIG. 1 or part of the electronic device 100 (for example, the processor 120). Hereinafter, an operation of synchronizing with the different cluster in operation 709 of FIG. 7A is described.

Referring to FIG. 8, the electronic device may determine whether the electronic device is a synchronization device transmitting a synchronization beacon in the cluster in operation 801. For example, the processor 120 may determine whether the electronic device 100 is set as any one of an anchor master device, a master device, and a non-master sync device defined in the NAN specification.

When the electronic device is set as the synchronization device, the electronic device may transmit a synchronization beacon of the different cluster to the cluster of the electronic device in operation 803. For example, the different cluster may include a cluster with which the electronic device is to synchronize.

When the electronic device is not set as the synchronization device or transmits a synchronization beacon of the different cluster to the cluster of the electronic device, the electronic device may synchronize with the different cluster in operation 805. For example, the processor 120 may synchronize with the different cluster through the synchronization beacon of the different cluster. For example, the processor 120 may receive a discovery beacon of the different cluster and join the different cluster.

Figure 9:
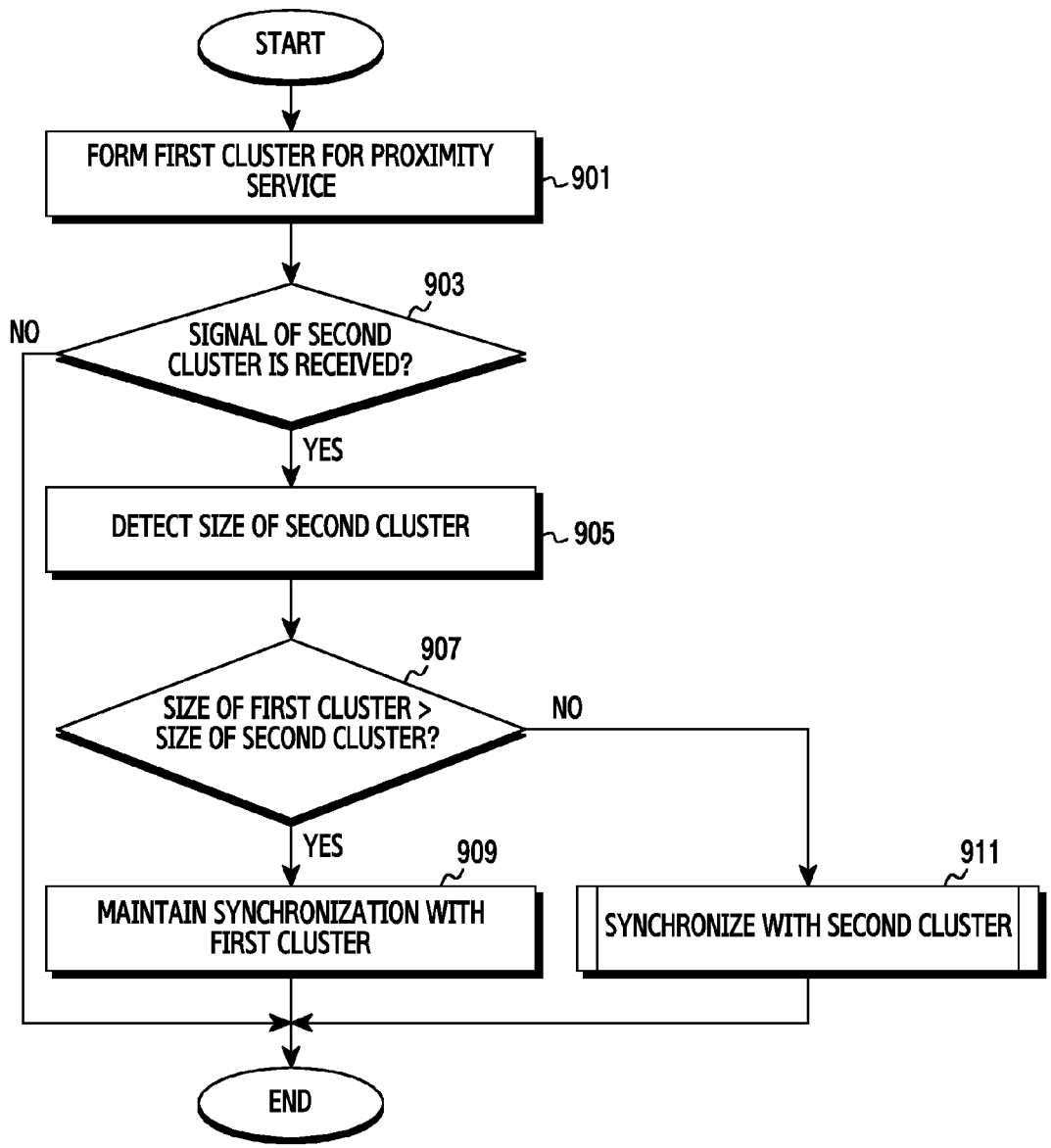
FIG. 9 is a flowchart of a method used by an electronic device for merging clusters based on the sizes of the clusters, according to an embodiment of the present disclosure.

FIG. 9 is a flowchart of a method used by an electronic device for merging clusters based on the sizes of the clusters, according to an embodiment of the present disclosure. In the following description, the electronic device may be the entire electronic device 100 illustrated in FIG. 1 or part of the electronic device 100 (for example, the processor 120).

Referring to FIG. 9, the electronic device may form a first cluster for a proximity service in operation 901. For example, when the processor 120 receives a discovery beacon transmitted by at least one different electronic device included in the first cluster, the processor 120 may join the first cluster. The processor 120 may receive a synchronization beacon in a synchronized proximity network period (for example, a DW) to synchronize with the different electronic device included in the cluster.

The electronic device may determine whether a signal of a second cluster is received in operation 903. For example, the processor 120 may determine whether a synchronization beacon or discovery beacon is received from a different electronic device included in the second cluster. When the synchronization beacon or discovery beacon of the second cluster is received, the processor 120 may determine that there is the second cluster overlapping with the first cluster.

When the signal of the second cluster is received, the electronic device may detect the size of the second cluster in operation 905. For example, the processor 120 may detect the size of the second cluster through a beacon or SDF received from the different electronic device included in the second cluster. For example, the size of the cluster may include at least one of the number of electronic devices included in the cluster, a total hop count of an electronic device forming the cluster, and the number of services provided by the cluster.

The electronic device may determine whether the size of the first cluster is greater than the size of the second cluster in operation 907. For example, the processor 120 may compare the size of the first cluster including the electronic device 100 with the size of the second cluster.

When the size of the first cluster is greater than the size of the second cluster, the electronic device may maintain synchronization with the first cluster in operation 909. For example, the processor 120 may maintain synchronization with at least one different electronic device included in the first cluster using a synchronization beacon received from a synchronization device of the first cluster during the synchronized proximity network period in the first cluster.

When the size of the first cluster is smaller than the size of the second cluster, the electronic device may synchronize with the second cluster in operation 911. For example, the processor 120 may synchronize with at least one different electronic device included in the second cluster using a synchronization beacon received from a different electronic device included in the second cluster. That is, the first cluster may be merged into the second cluster.

Figure 10:
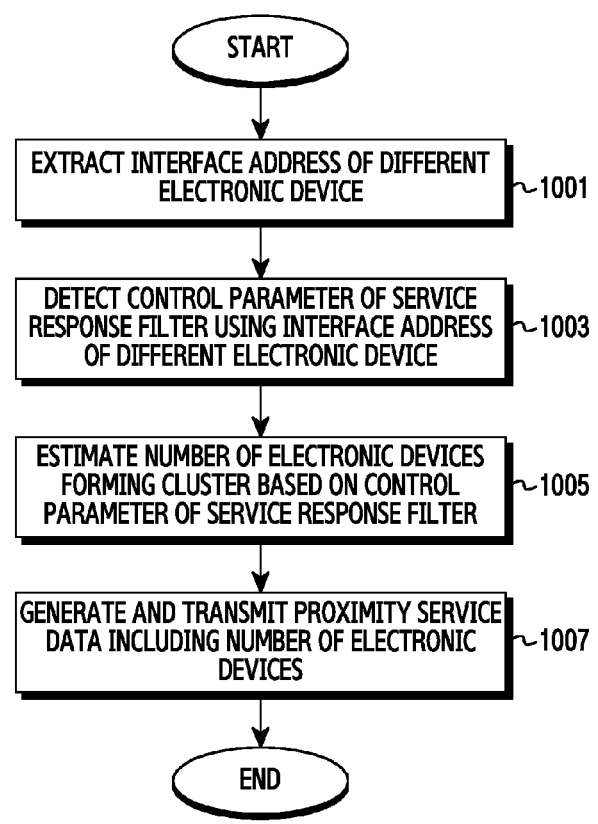
FIG. 10 is a flowchart of a method used by an electronic device for identifying the number of electronic devices included in a cluster using a service response filter, according to an embodiment of the present disclosure.

FIG. 10 is a flowchart of a method used by an electronic device for identifying the number of electronic devices included in a cluster using a service response filter, according to an embodiment of the present disclosure. In the following description, the electronic device may be the entire electronic device 100 illustrated in FIG. 1 or part of the electronic device 100 (for example, the processor 120). Hereinafter, an operation of estimating the number of electronic devices included in a cluster by a synchronization device among the electronic devices included in the cluster is described.

Referring to FIG. 10, the electronic device may extract an interface address of a different electronic device included in the cluster of the electronic device in operation 1001. For example, the processor 120 may monitor proximity service data transmitted from at least one different electronic device included in the same cluster of the electronic device 100 for a certain period of time. The processor 120 may extract the interface address of the different electronic device from the proximity service data transmitted from the different electronic device during monitoring.

The electronic device may detect a control parameter of a service response filter for the cluster using the interface address of the different electronic device in operation 1003. For example, according to the NAN specification, a bloom filter may be used as the service response filter in a service area of the cluster. Specifically, according to the NAN specification, as illustrated below in Table 1, 16 hash functions may be grouped into four sets of four hash functions, and a bloom filter may be defined using one set.

TABLE 1

| Bloom Filter | | Hash Functions | | | |
|---|---|---|---|---|---|
| Set | Index (Binary) | 1 | 2 | 3 | 4 |
| 1 | 00 | H(0x00, X, M) | H(0x01, X, M) | H(0x02, X, M) | H(0x03, X, M) |
| 2 | 01 | H(0x04, X, M) | H(0x05, X, M) | H(0x06, X, M) | H(0x07, X, M) |
| 3 | 10 | H(0x08, X, M) | H(0x09, X, M) | H(0x0A, X, M) | H(0x0B, X, M) |
| 4 | 11 | H(0x0C, X, M) | H(0x0D, X, M) | H(0x0E, X, M) | H(0x0F, X, M) |

In the hash functions in Table 1, 0x00 to 0x0F may represent the index of a hash function, X may be an input value of a bloom filter, which represents an interface address of an electronic device, and M may represent the size of a bloom filter. The processor 120 may apply the interface address of the different electronic device to hash functions in a random set among the four sets in Table 1 to find the value of M (control parameter) so that each hash function has a value of 1.

The electronic device may estimate the number of electronic devices included in the cluster based on the control parameter of the service response filter in operation 1005. For example, the processor 120 may estimate the number of electronic devices included in the cluster of the electronic device 100 by applying the size of a bloom filter (M) to Equation (1).

$$\text{Estimate Cluster Size} = -M \times \ln(1 - N/M)/K \qquad (1)$$

Here, Estimate Cluster Size may represent an estimated number of electronic devices included in the cluster, M may represent the size of a bloom filter, N may represent the number of bits of a bloom filter, and K may represent the number of hash functions included in a bloom filter.

The electronic device may generate proximity service data including the number of electronic devices included in the cluster and transmit the proximity service data during a proximity network period in operation 1007. For example, the processor 120 may transmit proximity service data configured as in Table 2, including the number of electronic devices included in the cluster. For example, the processor 120 may transmit a discovery beacon or synchronization beacon, including the number of electronic devices included in the cluster.

TABLE 2

| Attribute ID | Description | NAN Beacon frames | | |
|---|---|---|---|---|
| | | Synchronization | Discovery | NAN SDF |
| 0 | Master Indication Attribute | YES/M | YES/M | NO |
| 1 | Cluster AttributeMaster Indication Attribute | YES/M | YES/M | NO |
| 2 | Service ID List AttributeCluster Attribute | YES/O | YES/O | NO |
| 3 | Service Descriptor AttributeService ID List Attribute | NO | NO | YES/M |
| 4 | NAN Connection Capability AttributeService Descriptor Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14-220 | Cluster Size Attribute | YES/O | YES/O | NO |
| 221 | Vendor Specific Attribute | YES/O | YES/O | YES/O |
| 222-255 | Reserved | NA | NA | NA |

In Table 2, information on the number of electronic devices included in the cluster may be included in sections 14 to 220 of an attribute ID defined as a Cluster Size Attribute field. The Cluster Size Attribute field may be defined using sections 222 to 255 of the attribute ID.

For example, the processor 120 may transmit the number of electronic devices included in the cluster through a Vendor Specific Attribute field configured in Table 3.

TABLE 3

| Field | Size (octets) | Value | Description |
|---|---|---|---|
| Attribute ID | 1 | 0xDD | Identifies the type of NAN attribute |
| Length | 2 | Variable | Length of the following fields in the attribute |

TABLE 3-continued

| Field | Size (octets) | Value | Description |
|---|---|---|---|
| OUI | 3 | Variable | Vendor Specific OUI |
| Body | Variable | Variable | Cluster Size Attribute |

Table 3 illustrates a detailed configuration of the Vendor Specific Attribute field in section 221 of the attribute ID in Table 2, in which a Body field may include the information on the number of electric devices included in the cluster.

The electronic devices included in the cluster may identify the number of electronic devices included in the cluster with which the electronic device synchronizes through the proximity service data configured in Table 2 or Table 3.

The electronic devices included in a first cluster may include information on the number of electronic devices included in the first cluster, which is received from a synchronization device, in proximity service data in a form of Table 2 or Table 3 and transmit the information during a proximity network period. Accordingly, a different electronic device of a second cluster, which overlaps with or is adjacent to the first cluster, may identify the number of electronic devices included in the first cluster through the proximity service data configured in Table 2 or Table 3.

A synchronization device may monitor proximity service data transmitted by at least one different electronic device included in a cluster for a reference period of time to estimate the number of electronic devices included in the cluster.

Figure 11:
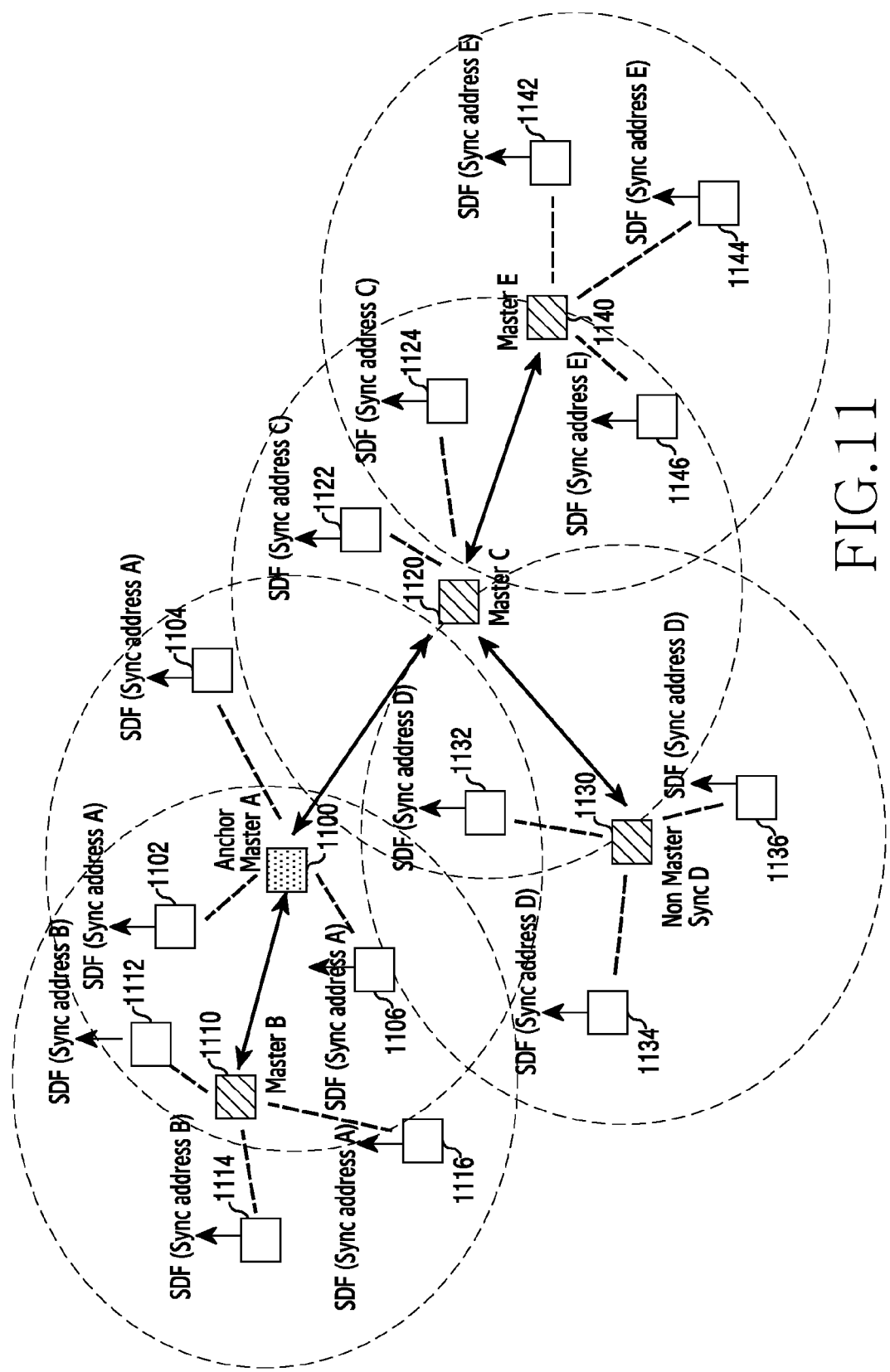
FIG. 11 is a diagram illustrating a configuration for identifying the number of electronic devices included in a cluster in a proximity network, according to an embodiment of the present disclosure.

FIG. 11 is a diagram illustrating a configuration for identifying the number of electronic devices included in a cluster in a proximity network, according to an embodiment of the present disclosure.

Referring to FIG. 11, synchronization devices 1100, 1110, 1120, 1130, and 1140 included in a cluster may transmit a synchronization beacon, including addresses of the synchronization devices (sync addresses), in a proximity network period. Accordingly, synchronized electronic devices in the cluster may transmit proximity service data, including sync addresses extracted in the proximity network period. For example, electronic devices 1102, 1104, and 1106 synchronized through a synchronization beacon received from anchor master device A 1100 may transmit proximity service data (SDF), including an address of anchor master device A 1100 (for example, sync address A). For example, electronic devices 1112, 1114, and 1116 synchronized through a synchronization beacon received from master device B 1110 may transmit proximity service data (SDF), including an address of master device B 1110 (for example, sync address B). For example, electronic devices 1122 and 1124 synchronized through a synchronization beacon received from master device C 1120 may transmit proximity service data (SDF), including an address of master device C 1120 (for example, sync address C). For example, electronic devices 1132, 1134, and 1136 synchronized through a synchronization beacon received from non-master device D 1130 may transmit proximity service data (SDF), including an address of non-master device D 1130 (for example, sync address D). For example, electronic devices 1142, 1144, and 1146 synchronized through a synchronization beacon received from master device E 1140 may transmit proximity service data (SDF), including an address of master device E 1140 (for example, sync address E). For example, proximity service data may include at least one of an SDF, a discovery beacon, and a synchronization beacon.

The synchronization devices 1100, 1110, 1120, 1130, and 1140 included in the cluster may identify the number of different electronic devices connected to the corresponding synchronization devices based on addresses of the synchronization devices (sync addresses) in the proximity service data (SDF) received from different electronic devices included in the cluster. For example, anchor master device A 1100 may receive proximity service data (SDF) from five electronic devices 1102, 1104, 1106, 1112, and 1132. Anchor master device A 1100 may determine the three electronic devices 1102, 1104, and 1106, which have transmitted the proximity service data (SDF) including the address of anchor master device A 1100 (for example, sync address A), as electronic devices synchronized by the anchor master device A 1100. For example, master device B 1110 may receive proximity service data (SDF) from five electronic devices 1102, 1106, 1112, 1114, and 1116. Master device B 1110 may determine the three electronic devices 1112, 1114, and 1116, which have transmitted the proximity service data (SDF) including the address of master device B 1110 (for example, sync address B), as electronic devices synchronized by the master device B 1110. For example, master device C 1120 may receive proximity service data (SDF) from four electronic devices 1122, 1124, 1132, and 1146. Master device C 1120 may determine the two electronic devices 1122 and 1124, which have transmitted the proximity service data (SDF) including the address of master device C 1120 (for example, sync address C), as electronic devices synchronized by the master device C 1120. For example, non-master device D (non-master sync D) 1130 may receive proximity service data (SDF) from three electronic devices 1132, 1134, and 1136. Non-master device D 1130 may determine the three electronic devices 1132, 1134, and 1136, which have transmitted the proximity service data (SDF) including the address of non-master device D 1130 (for example, sync address D), as electronic devices synchronized by the non-master device D 1130. For example, master device E 1140 may receive proximity service data (SDF) from four electronic devices 1124, 1142, 1144, and 1146. Master device E 1140 may determine the three electronic devices 1142, 1144, and 1146, which have transmitted the proximity service data (SDF) including the address of master device E 1140 (for example, sync address E), as electronic devices synchronized by the master device E 1140.

Each synchronization device 1100, 1110, 1120, 1130, or 1140 included in the cluster may transmit the number of electronic devices connected to the corresponding synchronization device and the address of the synchronization device (sync address) together, which are added to proximity service data (SDF). For example, each synchronization device 1100, 1110, 1120, 1130, or 1140 may transmit proximity service data configured in Table 4, including the number of electronic devices connected to the corresponding synchronization device.

TABLE 4

| Attribute ID | Description | NAN Beacon frames | | |
|---|---|---|---|---|
| | | Synchronization | Discovery | NAN SDF |
| 0 | Master Indication Attribute | YES/M | YES/M | NO |
| 1 | Cluster AttributeMaster Indication Attribute | YES/M | YES/M | NO |
| 2 | Service ID List AttributeCluster Attribute | YES/O | YES/O | NO |

TABLE 4-continued

| Attribute ID | Description | NAN Beacon frames | | |
| --- | --- | --- | --- | --- |
| | | Synchronization | Discovery | NAN SDF |
| 3 | Service Descriptor AttributeService ID List Attribute | NO | NO | YES/M |
| 4 | NAN Connection Capability AttributeService Descriptor Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14-220 | Sync Address Attribute | YES/O | YES/O | YES/O |
| 221 | Vendor Specific Attribute | YES/O | YES/O | YES/O |
| 222-255 | Reserved | NA | NA | NA |

In Table 4, information on the number of electronic devices synchronized through a synchronization device may be included in sections 14 to 220 of an attribute ID defined as a Sync Address Attribute field. The Sync Address Attribute field may be defined using sections 222 to 255 of the attribute ID.

For example, each synchronization device 1100, 1110, 1120, 1130, or 1140 may transmit the number of electronic devices connected to the corresponding synchronization device through a Vendor Specific Attribute field configured in Table 5.

TABLE 5

| Field | Size (octets) | Value | Description |
| --- | --- | --- | --- |
| Attribute ID | 1 | 0xDD | Identifies the type of NAN attribute |
| Length | 2 | Variable | Length of the following fields in the attribute |
| OUI | 3 | Variable | Vendor Specific OUI |
| Body | Variable | Variable | Sync Address Attribute, Count |

Table 5 illustrates a detailed configuration of the Vendor Specific Attribute field in section 221 of the attribute ID in Table 4, in which a Body field may include the information on the number of electric devices synchronized through the synchronization devices. The Body field may include information on the number of electric devices with respect to the address of each synchronization device.

The synchronization devices 1100, 1110, 1120, 1130, and 1140 included in the cluster may transmit proximity service data, including the number of electronic devices with respect to an address of a different synchronization device. For example, master device C 1120 may transmit information on the number of electronic devices synchronized through master device C 1120, which is included in the Body field of the Vendor Specific Attribute field as in Table 6.

TABLE 6

| Field | Size (octets) | Value | Description |
| --- | --- | --- | --- |
| Attribute ID | 1 | 0xDD | Identifies the type of NAN attribute |
| Length | 2 | Variable | Length of the following fields in the attribute |
| OUI | 3 | Variable | Vendor Specific OUI |
| Body | Variable | Variable | Sync Address C, 2 |

When proximity service data including information on the number of synchronized electronic devices is received from master device E 1140, master device C 1120 may transmit proximity service data, including the number of electronic devices synchronized by master device E 1140 as in Table 7.

TABLE 7

| Field | Size (octets) | Value | Description |
| --- | --- | --- | --- |
| Attribute ID | 1 | 0xDD | Identifies the type of NAN attribute |
| Length | 2 | Variable | Length of the following fields in the attribute |
| OUI | 3 | Variable | Vendor Specific OUI |
| Body | Variable | Variable | Sync Address C, 2 Sync Address E, 3 |

Electronic devices included in a cluster may identify the number of electronic devices included in the cluster with which the electronic devices synchronize through proximity service data configured in Table 4 or Table 5. For example, electronic devices may accumulate the number of electronic devices with respect to an address of each synchronization device to identify the number of electronic devices included in the cluster with which the electronic devices synchronize.

Electronic devices included in a different cluster may identify the number of electronic devices included in the cluster through proximity service data configured in Table 4 or Table 5.

Figure 12:
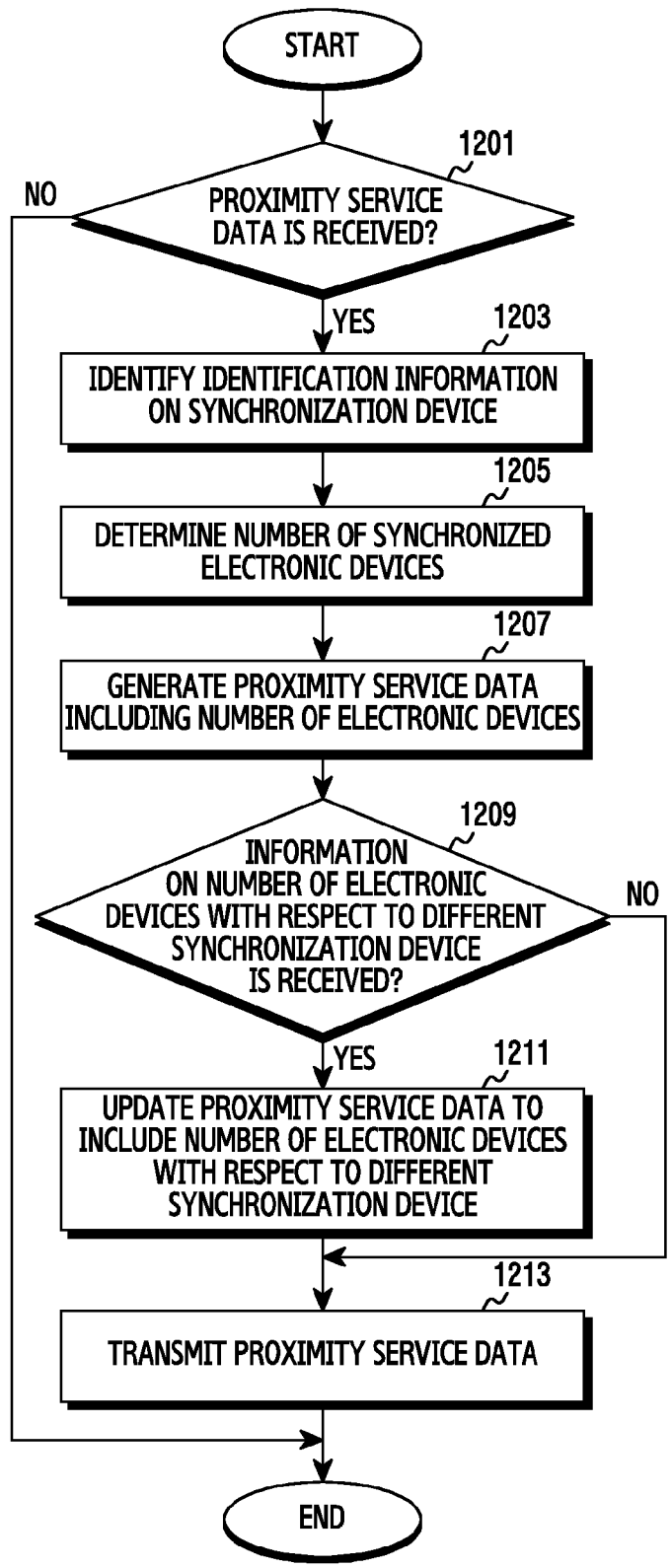
FIG. 12 is a flowchart of a method used by a synchronization device for identifying the number of electronic devices included in a cluster, according to an embodiment of the present disclosure.

FIG. 12 is a flowchart of a method used by a synchronization device for identifying the number of electronic devices included in a cluster, according to an embodiment of the present disclosure. In the following description, the electronic device may be the entire electronic device 100 illustrated in FIG. 1 or part of the electronic device 100 (for example, the processor 120). Hereinafter, an operation of estimating the number of electronic devices included in the cluster by the synchronization device among electronic devices included in the cluster is described.

Referring to FIG. 12, the electronic device may determine whether proximity service data is received from at least one different electronic device included in a synchronized cluster in operation 1201. For example, the proximity service data may include at least one of a discovery beacon, a synchronization beacon, and an SDF.

When no proximity service data is received, the electronic device may end the present algorithm for identifying the number of electronic devices included in the cluster.

When the proximity service data is received, the electronic device may identify identification information on the synchronization device included in the proximity data service in operation 1203. For example, the processor 120 may identify an address of the synchronization device included in the proximity service data received from the at least one different electronic device.

The electronic device may determine the number of electronic devices synchronized through the electronic device in operation 1205. For example, the processor 120 may determine, as an electronic device synchronized by the electronic device 100, the at least one different electronic device, which has transmitted the proximity service data including the address of the electronic device 100, among other electronic devices having transmitted proximity service data.

The electronic device may generate proximity service data including information on the number of electronic devices synchronized through the electronic device in operation 1207. For example, the processor 120 may generate the proximity service data including the information on the number of electronic devices synchronized through the electronic device 100 in a form of Table 4 or Table 6.

The electronic device may determine whether proximity service data including information on the number of electronic devices synchronized by a different synchronization device is received from a different electronic device in the cluster with which the electronic device synchronizes in operation 1209. For example, the processor 120 may determine whether the proximity service data received from the different electronic device in the cluster includes the information on the number of electronic devices synchronized by the different synchronization device.

When the proximity service data including the information on the number of electronic devices synchronized by the different synchronization device is not received, the electronic device may transmit the proximity service data including the information on the number of electronic devices synchronized by the electronic device in operation 1213. For example, the processor 120 may transmit the proximity service data including the information on the number of electronic devices synchronized through the electronic device 100 in a form of Table 4 or Table 6. For example, the processor 120 may transmit a discovery beacon, a synchronization beacon, or an SDF including the information on the number of electronic devices synchronized through the electronic device 100.

When the proximity service data including the information on the number of electronic devices synchronized by the different synchronization device is received, the electronic device may update the proximity service data to include the information on the number of electronic devices synchronized by the different synchronization device in operation 1211. For example, the processor 120 may update the proximity service data to include information on the numbers of electronic devices with respect to addresses of different synchronization devices as in Table 7.

The electronic device may transmit the updated proximity service data in operation 1213. For example, the processor 120 may transmit a synchronization beacon or an SDF including information on the number of electronic devices synchronized by a plurality of synchronization devices in a form of Table 4 or Table 7 within a proximity network period in which the electronic device 100 synchronizes. For example, the processor 120 may transmit a discovery beacon including information on the number of electronic devices synchronized by a plurality of synchronization devices in a form of Table 4 or Table 7.

Figure 13:
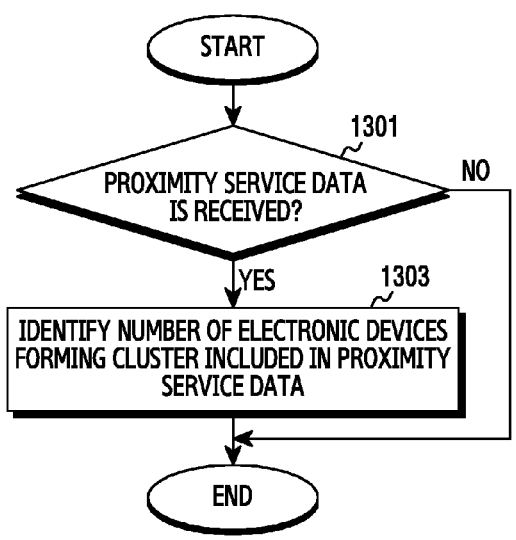
FIG. 13 is a flowchart of a method used by an electronic device for identifying the number of electronic devices included in a cluster determined by a synchronization device, according to an embodiment of the present disclosure.

FIG. 13 is a flowchart of a method used by an electronic device for identifying the number of electronic devices included in a cluster determined by a synchronization device, according to an embodiment of the present disclosure. In the following description, the electronic device may be the entire electronic device 100 illustrated in FIG. 1 or part of the electronic device 100 (for example, the processor 120). Hereinafter, an operation of identifying the number of electronic devices included in the cluster by electronic devices other than the synchronization device among the electronic devices included in the cluster is described.

Referring to FIG. 13, the electronic device may determine whether proximity service data is received from at least one different electronic device included in a synchronized cluster in operation 1301. For example, the processor 120 may receive a synchronization beacon or an SDF within a proximity network period in which the electronic device 100 synchronizes.

When no proximity service data is received, the electronic device may end the present algorithm for identifying the number of electronic devices included in the cluster.

When the proximity service data is received, the electronic device may detect the number of electronic devices included in the cluster using information on the number of electronic devices synchronized by the synchronization device included in the proximity service data in operation 1303. For example, the processor 120 may accumulate the number of electronic devices with respect to an address of each synchronization device included in the proximity service data to identify the number of electronic devices included in the cluster with which the electronic device 100 synchronizes.

Figure 14A:
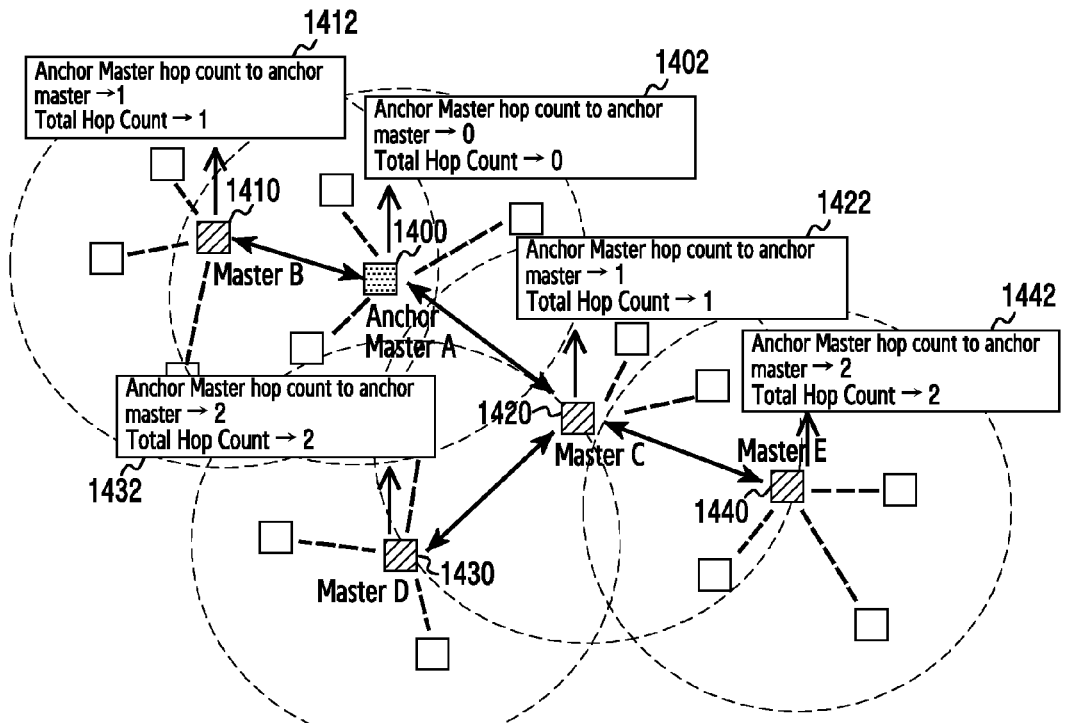
FIGS. 14A and 14B are diagrams illustrating a configuration for identifying a hop count of a cluster in a proximity network, according to an embodiment of the present disclosure.
Figure 14B:
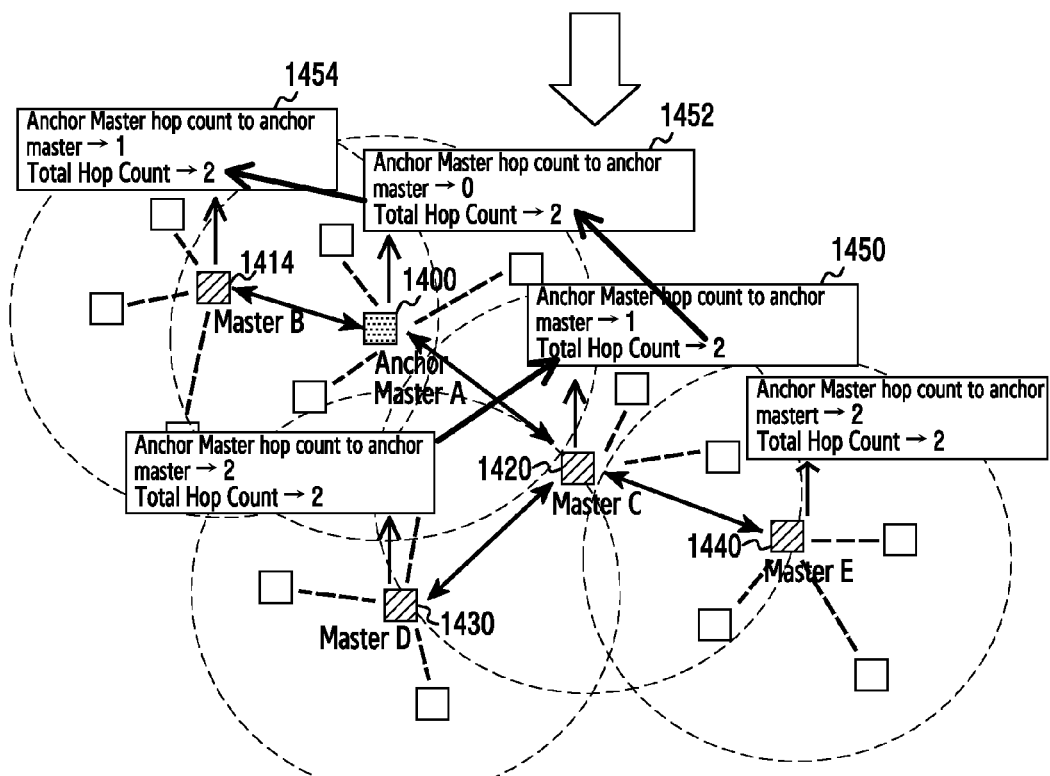

FIGS. 14A and 14B are diagrams illustrating a configuration for identifying a hop count of a cluster in a proximity network, according to an embodiment of the present disclosure.

Referring to FIG. 14A, each synchronization device 1400, 1410, 1420, 1430, or 1440 included in a cluster may identify a hop count to an anchor master device 1400 (hop count to anchor master) included in proximity service data (SDF). For example, each synchronization device 1400, 1410, 1420, 1430, or 1440 may identify a hop count to the anchor master device 1400 through an Anchor Master Information field of Cluster Attribute of Table 2, configured in Table 8 below.

TABLE 8

| Field | Size (octets) | Value | Description |
| --- | --- | --- | --- |
| Anchor Master Rank | 8 | Variable | Refer to the Master Rank definition in §3.3.3. |
| Hop Count to Anchor Master | 1 | Variable | The number of hops to the Anchor Master |
| Anchor Master Beacon Transmission Time | 4 | Variable | When sent by a Non-Anchor Master Device, carries the lower four (4) octets of the TSF of the transmission time of the Beacon sent by the Anchor Master. When sent by the Anchor Master Device set to 0x00000000 |

According to an embodiment, each synchronization device 1400, 1410, 1420, 1430, or 1440 may set a hop count to the anchor master device 1400 as a total hop count of a cluster. For example, anchor master device A 1400 may set a hop count of 0 as a total hop count of the cluster (1402). For example, master device B 1410 may set a hop count to the anchor master device 1400, which is 1, as a total hop count of the cluster (1412). For example, master device C 1420 may set a hop count to the anchor master device 1400, which is 1, as a total hop count of the cluster (1422). For example, master device D 1430 may set a hop count to the anchor master device 1400, which is 2, as a total hop count of the cluster (1432). For example, master device E 1440 may set a hop count to the anchor master device 1400, which is 2, as a total hop count of the cluster (1442).

Each synchronization device 1400, 1410, 1420, 1430, or 1440 may transmit proximity service data including the total hop count of the cluster. For example, each synchronization device 1400, 1410, 1420, 1430, or 1440 may transmit proximity service data configured in Table 9, including the total hop count of the cluster.

TABLE 9

| Attribute ID | Description | NAN Beacon frames | | |
|---|---|---|---|---|
| | | Synchronization | Discovery | NAN SDF |
| 0 | Master Indication Attribute | YES/M | YES/M | NO |
| 1 | Cluster AttributeMaster Indication Attribute | YES/M | YES/M | NO |
| 2 | Service ID List AttributeCluster Attribute | YES/O | YES/O | NO |
| 3 | Service Descriptor AttributeService ID List Attribute | NO | NO | YES/M |
| 4 | NAN Connection Capability AttributeService Descriptor Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14-220 | Total Hop Count Attribute | YES/O | YES/O | No |
| 221 | Vendor Specific Attribute | YES/O | YES/O | YES/O |
| 222-255 | Reserved | NA | NA | NA |

In Table 9, the total hop count of the cluster may be included in sections 14 to 220 of an attribute ID defined as a Total Hop Count Attribute field. The Total Hop Count Attribute field may be defined using sections 222 to 255 of the attribute ID.

For example, each synchronization device 1400, 1410, 1420, 1430, or 1440 may transmit the total hop count of the cluster through a Vendor Specific Attribute field configured in Table 10.

TABLE 10

| Field | Size (octets) | Value | Description |
|---|---|---|---|
| Attribute ID | 1 | 0xDD | Identifies the type of NAN attribute |
| Length | 2 | Variable | Length of the following fields in the attribute |
| OUI | 3 | Variable | Vendor Specific OUI |
| Body | Variable | Variable | Total Hop Count |

Table 10 illustrates a detailed configuration of the Vendor Specific Attribute field in section 221 of the attribute ID in Table 9, in which a Body field may include the total hop count of the cluster.

Referring to FIG. 14B, each synchronization device 1400, 1410, 1420, 1430, or 1440 may update the total hop count of the cluster into one having a greater value of the hop count to the anchor master device 1400 and the total hop count of the cluster included in the proximity service data. For example, when master device C 1420, which sets the total hop count of the cluster to 0, receives proximity service data having the total hop count of the cluster set to 2 from master device D 1430, master device C 1420 may transmit the total hop count of the cluster updated to 2 (1450). For example, when anchor master device A 1400, which sets the total hop count of the cluster to 1, receives proximity service data having the total hop count of the cluster set to 2 from master device C 1420, anchor master device A 1400 may transmit the total hop count of the cluster updated to 2 (1452). For example, when master device B 1410, which sets the total hop count of the cluster to 1, receives proximity service data having the total hop count of the cluster set to 2 from the anchor master device 1400, master device B 1410 may transmit the total hop count of the cluster updated to 2 (1454).

Electronic devices included in a different cluster may identify a total hop count of the cluster through proximity service data on the cluster configured in Table 9 or Table 10.

Figure 15:
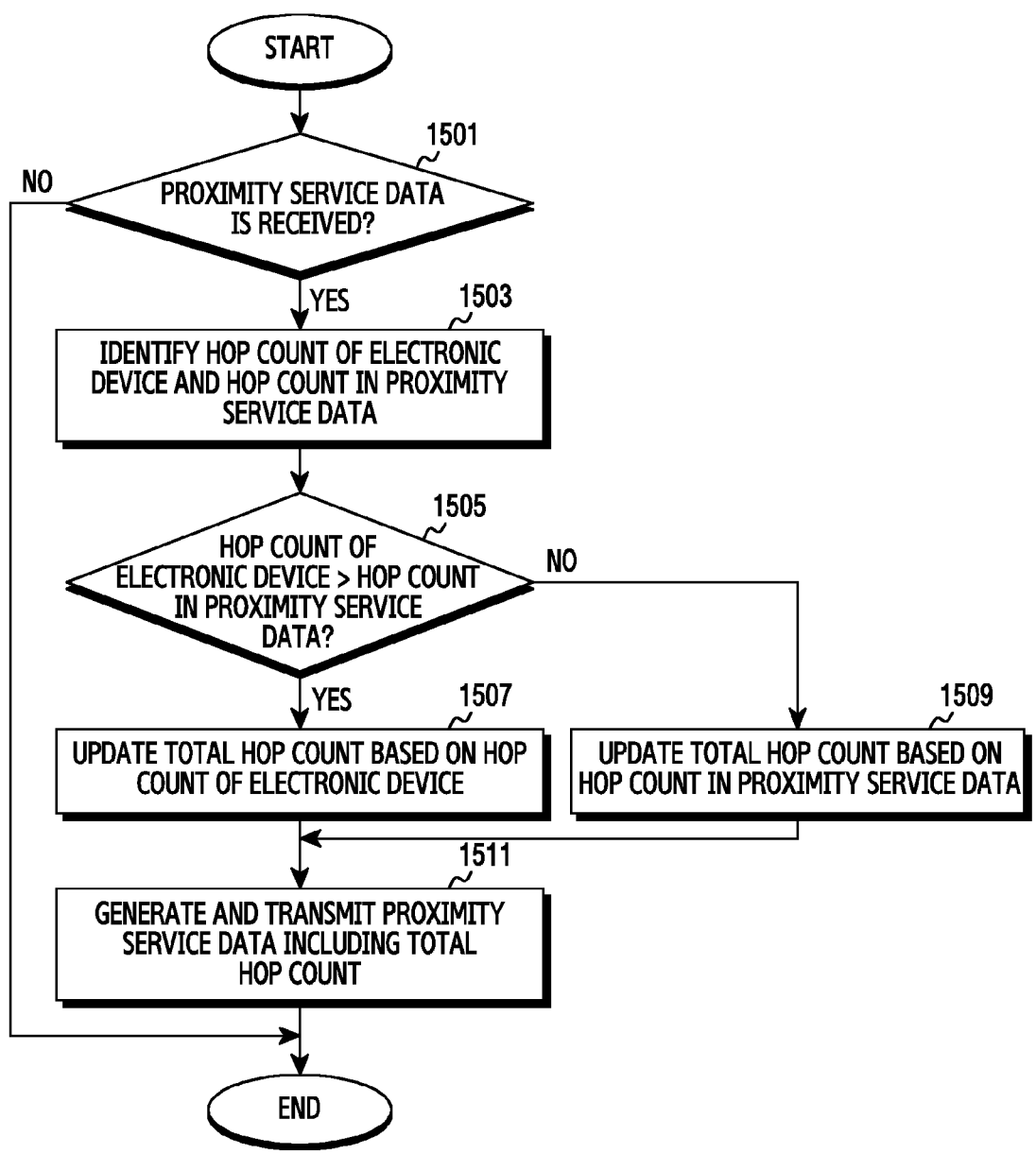
FIG. 15 is a flowchart of a method used by a synchronization device for identifying a hop count of a cluster, according to an embodiment of the present disclosure.

FIG. 15 is a flowchart of a method used by a synchronization device for identifying a hop count of a cluster, according to an embodiment of the present disclosure. In the following description, the electronic device may be the entire electronic device 100 illustrated in FIG. 1 or part of the electronic device 100 (for example, the processor 120).

Referring to FIG. 15, the electronic device may determine whether proximity service data is received from at least one different electronic device included in a synchronized cluster in operation 1501. For example, the processor 120 may determine whether at least one of a discovery beacon, a synchronization beacon, and an SDF is received through the communication interface 170.

When no proximity service data is received, the electronic device may end the present algorithm for identifying the hop count of the cluster.

When the proximity service data is received, the electronic device may identify a hop count of the electronic device and a hop count included in the proximity service data in operation 1503. For example, the hop count of the electronic device may include a total hop count of the cluster determined by the electronic device 100, and the hop count in the proximity service data may include a total hop count of the cluster included in the proximity service data. For example, the processor 120 may determine a hop count from the electronic device 100 to an anchor master device as the hop count of the electronic device 100. Alternatively, the processor 120 may identify the hop count of the electronic device 100 updated based on a hop count in proximity service data received from a different electronic device at a previous time. The processor 120 may identify a total hop count of the cluster through proximity service data configured in Table 9 or Table 10.

The electronic device may determine whether the hop count of the electronic device exceeds the hop count in the proximity service data in operation 1505. For example, the processor 120 may compare the total hop count of the cluster determined by the electronic device 100 with the total hop count of the cluster included in the proximity service data.

When the hop count of the electronic device exceeds the total hop count in the proximity service data, the electronic device may update the total hop count of the cluster into the hop count of the electronic device in operation 1507. For example, the processor 120 may determine the total hop count of the cluster determined by the electronic device 100 as the total hop count of the cluster.

When the hop count of the electronic device is the hop count in the proximity service data or smaller, the electronic device may update the total hop count of the cluster into the hop count in the proximity service data in operation 1509. For example, in FIG. 14A, master device B 1410 may set the total hop count of the cluster to 1 based on a hop count to anchor master device A 1400. As illustrated in FIG. 14B, when master device B 1410 receives proximity service data having the total hop count of the cluster set to 2 from anchor master device A 1400, master device B 1410 may transmit the total hop count of the cluster updated to 2 (1454).

The electronic device may transmit proximity service data including the total hop count of the cluster to a proximity network in operation 1511. For example, the processor 120 may generate and transmit the proximity service data including the total hop count of the cluster through the Total Hop Count Attribute field in Table 9. For example, the processor 120 may generate and transmit the proximity service data including the total hop count of the cluster through the Body field of the Vendor Specific Attribute field in Table 10.

Figure 16A:
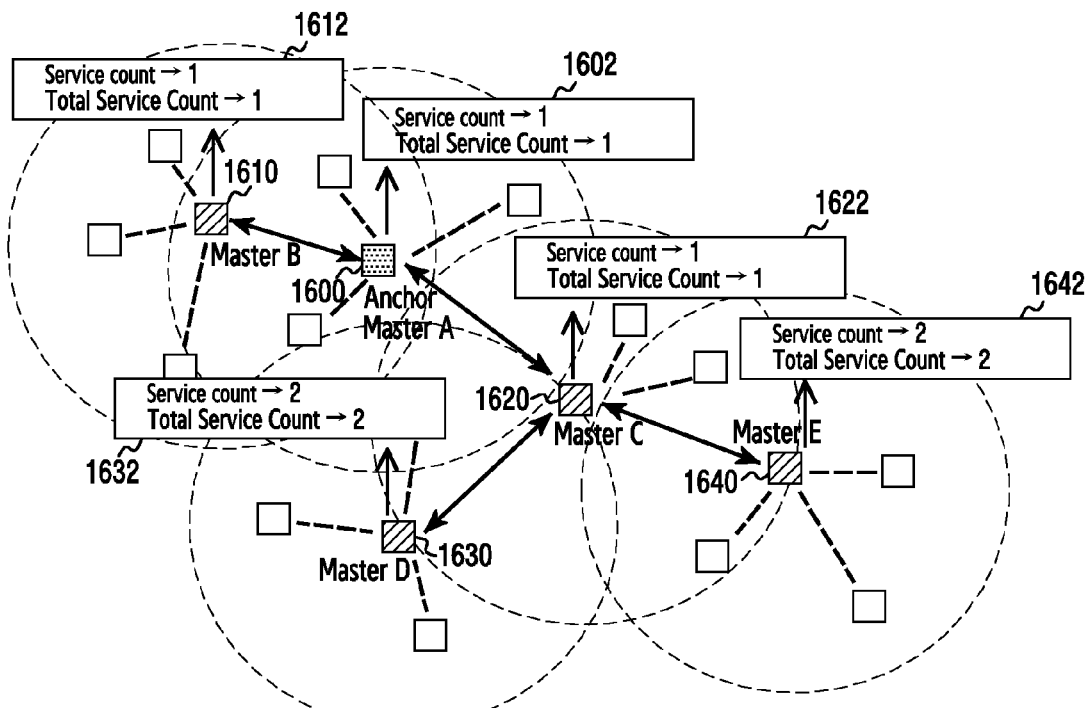
FIGS. 16A and 16B are diagrams illustrating a configuration for identifying the number of services of a cluster in a proximity network, according to an embodiment of the present disclosure.
Figure 16B:
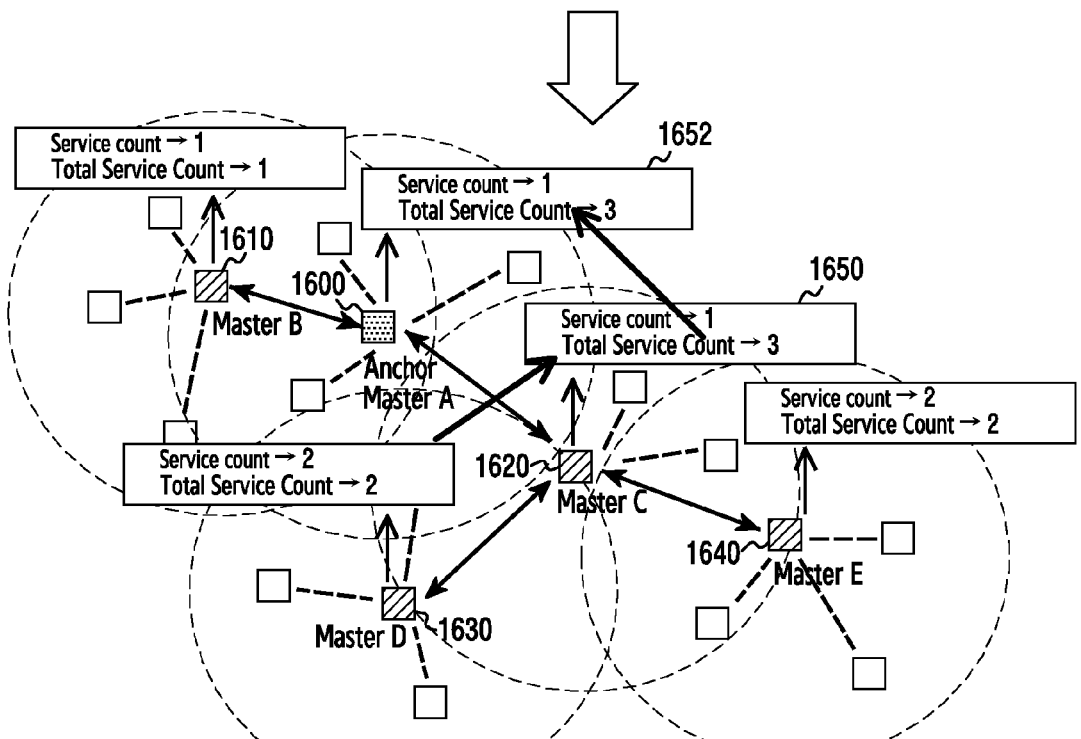

FIGS. 16A and 16B are diagrams illustrating a configuration for identifying the number of services of a cluster in a proximity network, according to an embodiment of the present disclosure.

Referring to FIG. 16A, each synchronization device 1600, 1610, 1620, 1630, or 1640 included in a cluster may identify the number of services of at least one electronic device connected by one hop included in proximity service data. For example, each synchronization device 1600, 1610, 1620, 1630, or 1640 may identify a service ID and the number of services of at least one electronic device connected by one hop through a Service ID List Attribute field configured in Table 11.

TABLE 11

| Field | Size (octets) | Value | Description |
|---|---|---|---|
| Attribute ID | 1 | 0x02 | Identifies the type of NAN attribute |
| Length | 2 | Variable | Length of the following fields in the attribute |
| Service ID | 6*N | Variable | One or more Service IDs, where N is the number of Service IDs in this container |

According to an embodiment, each synchronization device 1600, 1610, 1620, 1630, or 1640 may set the number of services of at least one electronic device connected by one hop as a total service count of the cluster. For example, anchor master device A 1600 may set the number of services of at least one electronic device connected by one hop, which is 1, as a total service count of the cluster (1602). For example, master device B 1610 may set the number of services of at least one electronic device connected by one hop, which is 1, as a total service count of the cluster (1612). For example, master device C 1620 may set the number of services of at least one electronic device connected by one hop, which is 1, as a total service count of the cluster (1622). For example, master device D 1630 may set the number of services of at least one electronic device connected by one hop, which is 2, as a total service count of the cluster (1632). For example, master device E 1640 may set the number of services of at least one electronic device connected by one hop, which is 2, as a total service count of the cluster (1642).

Each synchronization device 1600, 1610, 1620, 1630, or 1640 may transmit proximity service data including the total service count of the cluster. For example, each synchronization device 1600, 1610, 1620, 1630, or 1640 may transmit proximity service data configured in Table 12, including the total service count of the cluster.

TABLE 12

| Attribute ID | Description | NAN Beacon frames | | |
|---|---|---|---|---|
| | | Synchronization | Discovery | NAN SDF |
| 0 | Master Indication Attribute | YES/M | YES/M | NO |
| 1 | Cluster AttributeMaster Indication Attribute | YES/M | YES/M | NO |
| 2 | Service ID List AttributeCluster Attribute | YES/O | YES/O | NO |
| 3 | Service Descriptor AttributeService ID List Attribute | NO | NO | YES/M |
| 4 | NAN Connection Capability AttributeService Descriptor Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14-220 | Total Service Count Attribute | YES/O | YES/O | No |
| 221 | Vendor Specific Attribute | YES/O | YES/O | YES/O |
| 222-255 | Reserved | NA | NA | NA |

In Table 12, the total service count of the cluster may be included in sections 14 to 220 of an attribute ID defined as a Total Service Count Attribute field. The Total Service Count Attribute field may be defined using sections 222 to 255 of the attribute ID.

For example, each synchronization device 1600, 1610, 1620, 1630, or 1640 may transmit the total service count of the cluster through a Vendor Specific Attribute field configured in Table 13.

TABLE 13

| Field | Size (octets) | Value | Description |
|---|---|---|---|
| Attribute ID | 1 | 0xDD | Identifies the type of NAN attribute |
| Length | 2 | Variable | Length of the following fields in the attribute |
| OUI | 3 | Variable | Vendor Specific OUI |
| Body | Variable | Variable | Total Service Count |

Table 13 illustrates a detailed configuration of the Vendor Specific Attribute field in section 221 of the attribute ID in Table 12, in which a Body field may include the total service count of the cluster.

Referring to FIG. 16B, each synchronization device 1600, 1610, 1620, 1630, or 1640 may update the total service count of the cluster based on the number of services of at least one electronic device connected by one hop and service ID information included in the proximity service data in Table 11. For example, master device C 1620, which sets a total service count of the cluster to 1, may receive proximity service data having a total service count of the cluster set to 2 from master device E 1640. Master device C 1620 may compare a service ID of an electronic device connected by one hop with a service ID provided from master device E 1640 and delete an overlapping service. When master device C 1620 has no overlapping service ID with that of master device E 1640, master device C 1620 may transmit the total service count of the cluster updated to 3 (1650). For example, anchor master device A 1600, which sets a total service count of the cluster to 1, may receive proximity service data having a total service count of the cluster set to 3 from master device C 1620. Anchor master device A 1600 may compare a service ID of an electronic device connected by one hop with a service ID provided from master device C 1620 and delete an overlapping service. When anchor master device A 1600 has one overlapping service ID with that of master device C 1620, anchor master device A 1600 may transmit the total service count of the cluster updated to 3 (1652).

Electronic devices included in a different cluster may identify a total service count of the cluster through proximity service data on the cluster configured in Table 12 or Table 13.

Figure 17:
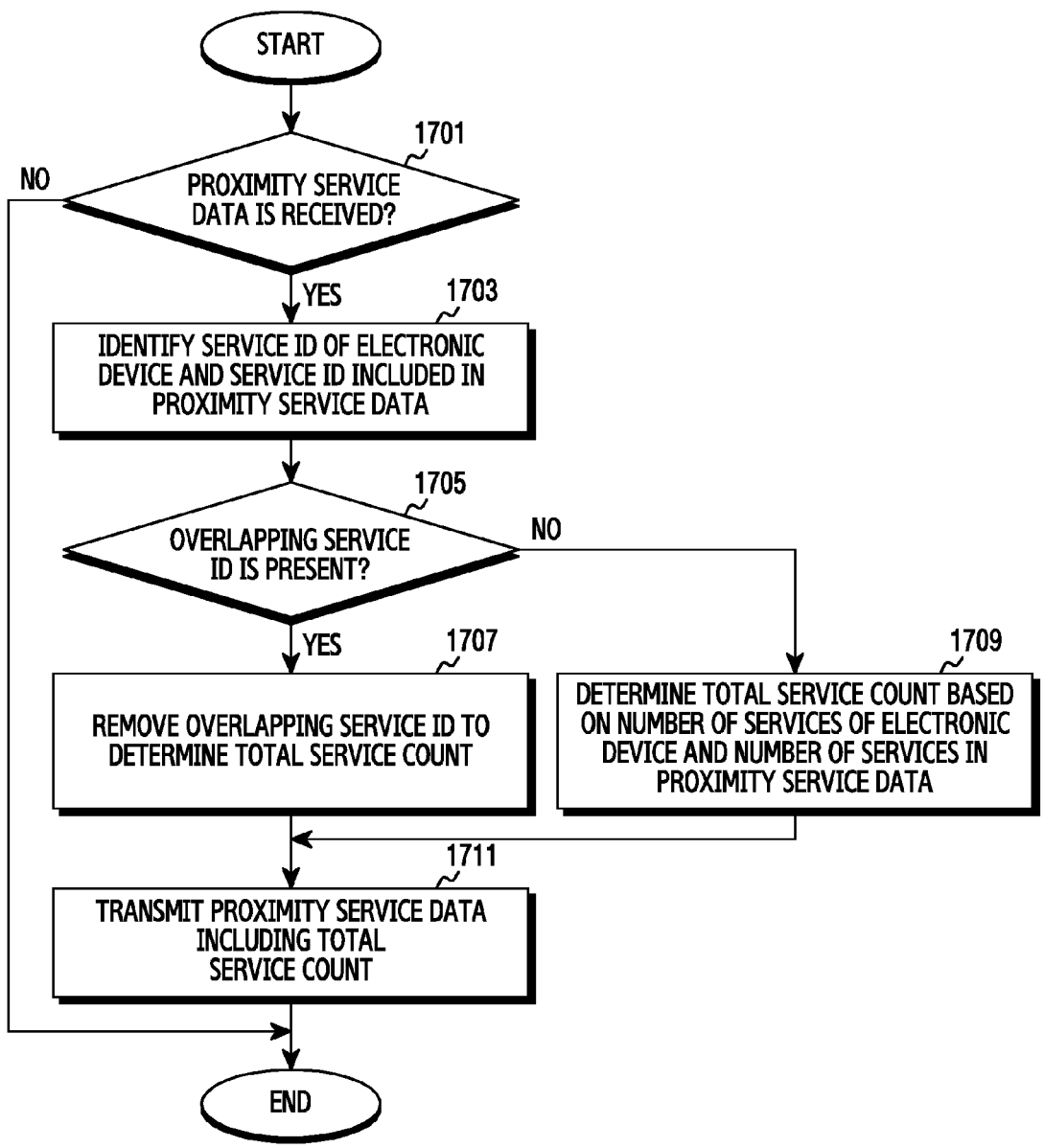
FIG. 17 is a flowchart of a method used by a synchronization device identifies the number of services of a cluster, according to an embodiment of the present disclosure.

FIG. 17 is a flowchart of a method used by a synchronization device identifies the number of services of a cluster, according to an embodiment of the present disclosure. In the following description, the electronic device may be the entire electronic device 100 illustrated in FIG. 1 or part of the electronic device 100 (for example, the processor 120).

Referring to FIG. 17, the electronic device may determine whether proximity service data is received from at least one different electronic device included in a cluster with which the electronic device synchronizes in operation 1701. For example, the processor 120 may determine whether at least one of a synchronization beacon and an SDF is received in a proximity network period in which the electronic device 100 synchronizes.

When no proximity service data is received, the electronic device may end the present algorithm for identifying the number of services of the cluster.

When the proximity service data is received, the electronic device may identify a service ID of the electronic device and a service ID included in the proximity service data in operation 1703. For example, the processor 120 may determine identification information on a service provided from at least one different electronic device connected by one hop as a service ID of the electronic device 100. Alternatively, the processor 120 may identify a service ID of the electronic device 100 updated based on a service ID included in proximity service data received from a different electronic device at a previous time. For example, the service ID in the proximity service data may include identification information on a service provided from a cluster, acquired by a different synchronization device. The proximity service data may include service ID information through the Service ID List Attribute field in Table 11.

The electronic device may determine whether there is an overlapping service ID among service IDs of the electronic device and service IDs in the proximity service data in operation 1705.

When there is an overlapping service ID among the service IDs of the electronic device and the service IDs in the proximity service data, the electronic device may remove the overlapping service ID to determine a total service count of the cluster in operation 1707. For example, the processor may remove the number of overlapping service IDs from the sum of the number of services of the electronic device and the number of services in the proximity service data to determine a total service count of the cluster. For example, the number of services of the electronic device may include a total service count of the cluster determined by the electronic device, and the number of services in the proximity service data may include a total service count of the cluster included in the proximity service data. In FIG. 16A, anchor master device A 1600 may set the number of services of at least one electronic device connected by one hop, identified through the Service ID List Attribute field in Table 11, which is 1, as a total service count of the cluster. As illustrated in FIG. 16B, when anchor master device A 1600 receives proximity service data having a total service count of the cluster set to 3 from master device C 1620, anchor master device A 1600 may determine whether there is an overlapping service ID. When there is one overlapping service ID, anchor master device A 1600 may transmit the total service count of the cluster updated to 3 (1652).

When there is no overlapping service ID among the service IDs of the electronic device and the service IDs in the proximity service data, the electronic device may determine a total service count of the cluster based on the number of services of the electronic device and the number of services in the proximity service data in operation 1709. For example, the processor 120 may determine the sum of the number of services of the electronic device and the number of services in the proximity service data as a total service count of the cluster. In FIG. 16A, master device C 1620 may set the number of services of at least one electronic device connected by one hop, identified through the Service ID List Attribute field in Table 11, which is 1, as a total service count of the cluster. As illustrated in FIG. 16B, when master device C 1620 receives proximity service data having a total service count of the cluster set to 2 from master device D 1630, master device C 1620 may determine whether there is an overlapping service ID. When there is no overlapping service ID, master device C 1620 may transmit the total service count of the cluster updated to 3 (1650).

The electronic device may transmit proximity service data including the total service count of the cluster to a proximity network in operation 1711. For example, the processor 120 may generate and transmit the proximity service data including the total service count of the cluster through the Total Service Count Attribute field in Table 12. For example, the processor 120 may generate and transmit the proximity service data including the total service count of the cluster through the Body field of the Vendor Specific Attribute field in Table 13.

Figure 18:
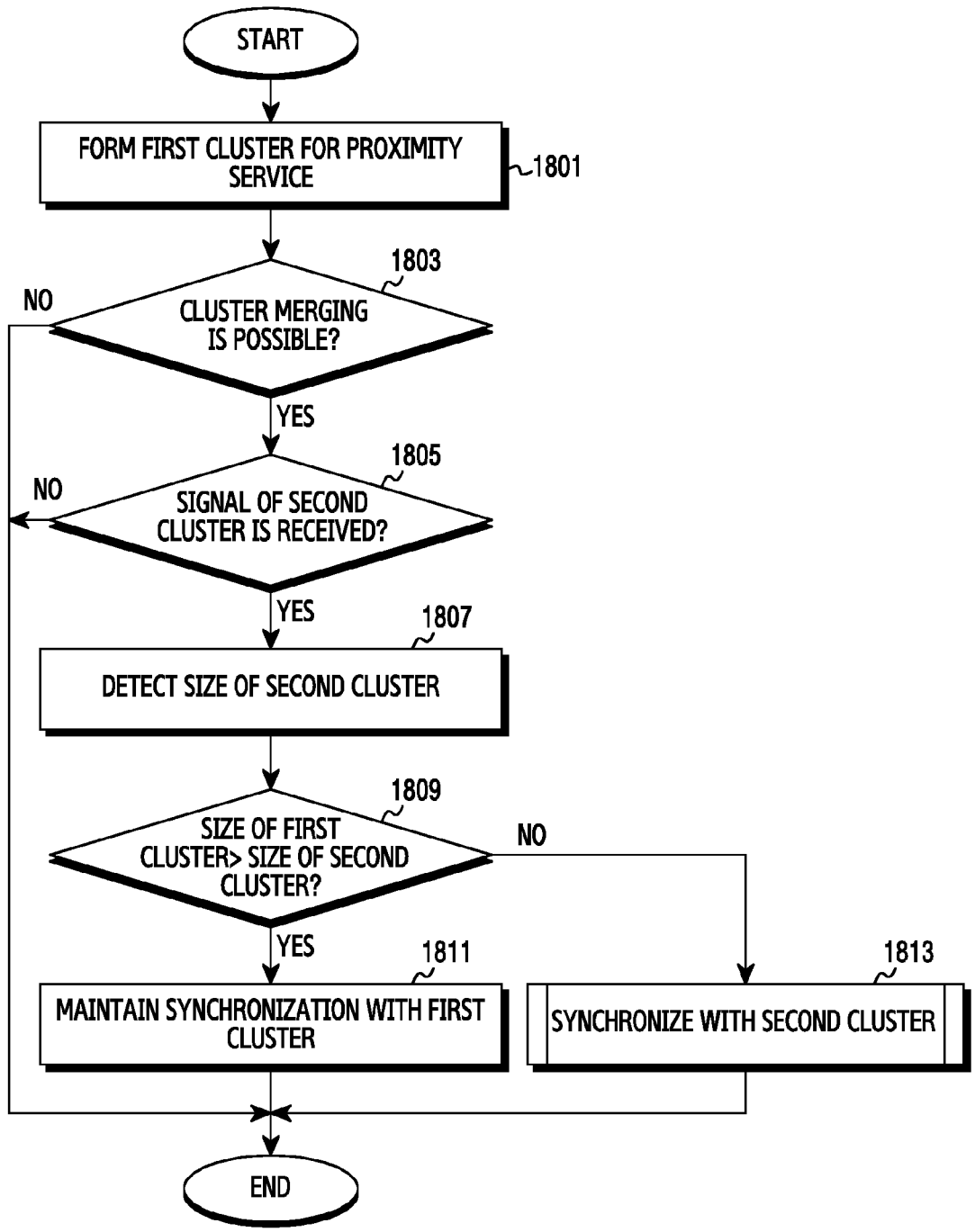
FIG. 18 is a flowchart of a method used in a proximity network for selectively performing cluster merging, according to an embodiment of the present disclosure.

FIG. 18 is a flowchart of a method used in a proximity network for selectively performing cluster merging, according to an embodiment of the present disclosure. In the following description, the electronic device may be the entire electronic device 100 illustrated in FIG. 1 or part of the electronic device 100 (for example, the processor 120).

Referring to FIG. 18, the electronic device may form a first cluster for a proximity service in operation 1801. For example, the processor 120 receives a discovery beacon transmitted by at least one different electronic device included in the first cluster to join the first cluster. The processor 120 may receive a synchronization beacon and an SDF in a synchronized proximity network period by the first cluster.

The electronic device may determine whether cluster merging is possible based on a security level of the first cluster in operation 1803. For example, the processor 120 may determine whether the security level of the first cluster exceeds a threshold level. When the security level of the first cluster exceeds the threshold level, the processor 120 may determine that a personal mode is set and may restrict cluster merging.

When cluster merging of the first cluster is restricted, the electronic device may maintain synchronization with the first cluster even though a second cluster that overlaps with or is adjacent to the first cluster is detected.

When it is determined that cluster merging of the first cluster is possible, the electronic device may determine whether a signal of a second cluster is received in operation 1805. For example, the processor 120 may determine whether proximity service data is received from a different electronic device included in the second cluster. For example, the processor 120 may determine whether the signal of the second cluster is received based on identification information on the cluster included in the proximity service data. When the proximity service data is received from the different electronic device included in the second cluster, the processor 120 may determine that there is the second cluster that overlaps with or is adjacent to the first cluster.

When the signal of the second cluster is not received, the electronic device may determine that there is no second cluster that overlaps with or is adjacent to the first cluster. Accordingly, the electronic device may maintain synchronization with the first cluster.

When the signal of the second cluster is received, the electronic device may detect the size of the second cluster in operation 1807. For example, the processor 120 may extract size information on the second cluster included in the proximity service data received from the different electronic device included in the second cluster. For example, the size of the cluster may include at least one of the number of electronic devices included in the cluster, a total hop count of an electronic device forming the cluster, and the total number of services provided by the cluster.

The electronic device may compare the size of the first cluster and the size of the second cluster to determine whether the size of the first cluster is greater than the size of the second cluster in operation 1809.

When the size of the first cluster is greater than the size of the second cluster, the electronic device may maintain synchronization with the first cluster in operation 1811. For example, the processor 120 may maintain synchronization with at least one different electronic device included in the first cluster using a synchronization beacon received from a synchronization device of the first cluster during the synchronized proximity network period in the first cluster.

When the size of the first cluster is the size of the second cluster or smaller, the electronic device may synchronize with the second cluster in operation 1813. For example, the processor 120 may synchronize with at least one different electronic device included in the second cluster using a synchronization beacon received from a different electronic device included in the second cluster. That is, the first cluster may be merged into the second cluster.

Figure 19:
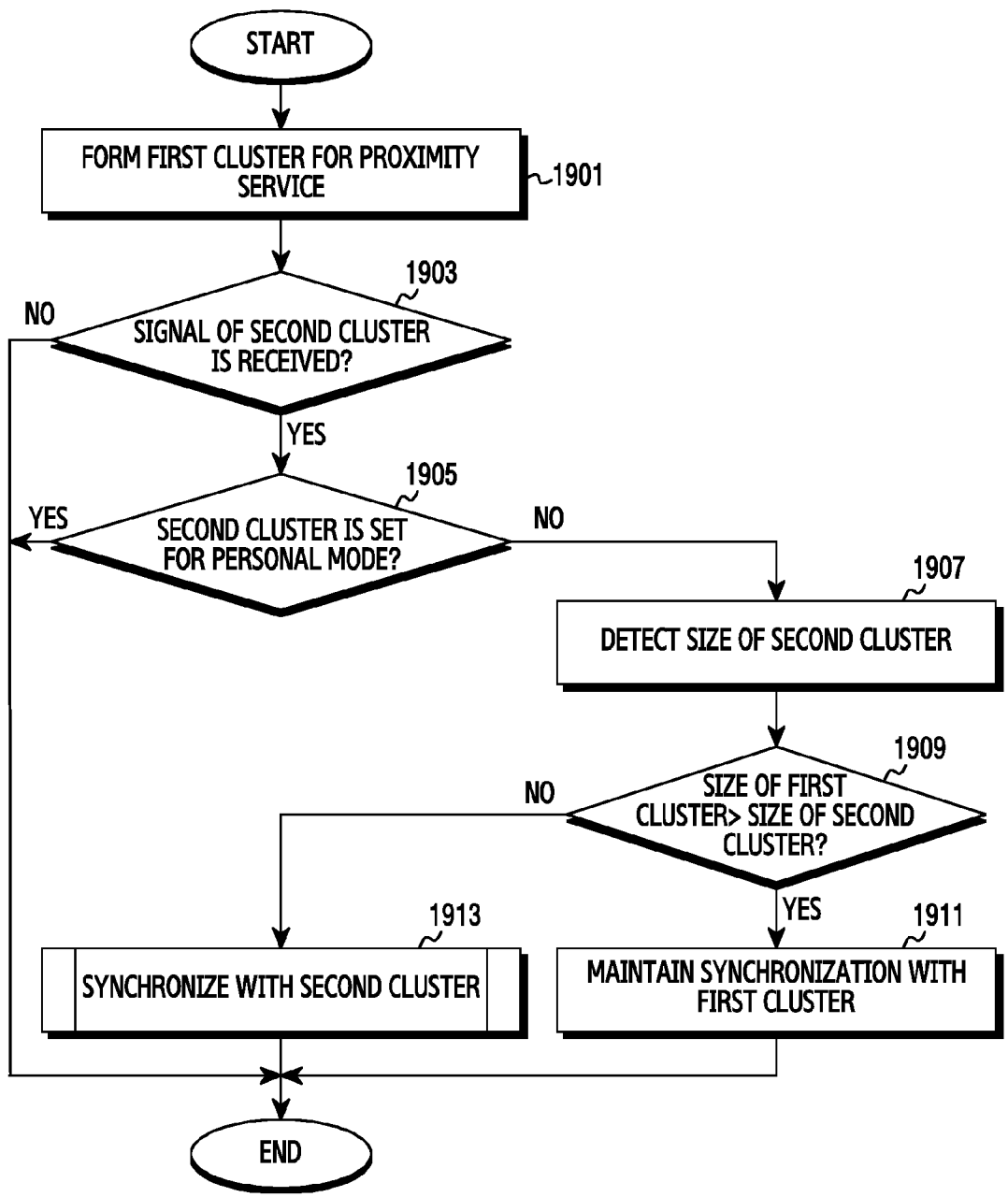
FIG. 19 is a flowchart of a method used in a proximity network for selectively performing cluster merging based on whether a cluster is set for a personal mode, according to an embodiment of the present disclosure.

FIG. 19 is a flowchart of a method used in a proximity network for selectively performing cluster merging based on whether a cluster is set for a personal mode, according to an embodiment of the present disclosure. In the following description, the electronic device may be the entire electronic device 100 illustrated in FIG. 1 or part of the electronic device 100 (for example, the processor 120). Hereinafter, an operation of an electronic device, included in a cluster which is not set for the personal mode, synchronizing with a different cluster that overlaps with or is adjacent to the cluster is described.

Referring to FIG. 19, the electronic device may synchronize with a first cluster for a proximity service in operation 1901. For example, the processor 120 may receive a synchronization beacon in a proximity network period of the first cluster with which the electronic device 100 synchronizes to synchronize with at least one different electronic device included in the first cluster.

The electronic device may determine whether a signal of a second cluster is received in operation 1903. For example, when the processor 120 receives proximity service data from at least one different electronic device, the processor 120 may determine whether the signal of the second cluster is received based on identification information on the cluster included in the proximity service data. When the signal of the second cluster is received, the processor 120 may determine that there is the second cluster that overlaps with or is adjacent to the first cluster.

When the signal of the second cluster is not received, the electronic device may determine that there is no second cluster that overlaps with or is adjacent to the first cluster. Accordingly, the electronic device may maintain synchronization with the first cluster.

When the signal of the second cluster is received, the electronic device may determine whether the second cluster is set for the personal mode in operation 1905. For example, the processor 120 may detect a security level of the second cluster from the proximity service data on the second cluster. When the security level of the second cluster exceeds a threshold level, the processor 120 may determine that the second cluster is set for the personal mode.

When the second cluster is set for the personal mode, the electronic device may determine that merging of the second cluster is restricted. Accordingly, the electronic device may maintain synchronization with the first cluster.

When the second cluster is not set for the personal mode, the electronic device may detect the size of the second cluster in operation 1907. For example, the processor 120 may extract size information on the second cluster from the proximity service data on the second cluster received in operation 1903. For example, the size of the cluster may include at least one of the number of electronic devices included in the cluster, a total hop count of an electronic device forming the cluster, and the total number of services provided by the cluster.

The electronic device may compare the size of the first cluster and the size of the second cluster to determine whether the size of the first cluster is greater than the size of the second cluster in operation 1909.

When the size of the first cluster is greater than the size of the second cluster, the electronic device may maintain synchronization with the first cluster in operation 1911. For example, the processor 120 may maintain synchronization with at least one different electronic device included in the first cluster with which the electronic device 100 synchronizes. In this case, the processor 120 may maintain synchronization with at least one different electronic device included in the first cluster using a synchronization beacon received from a synchronization device of the first cluster during the proximity network period in which the electronic device 100 synchronizes.

When the size of the first cluster is the size of the second cluster or smaller, the electronic device may synchronize with the second cluster in operation 1913. For example, the processor 120 may synchronize with at least one different electronic device included in the second cluster using a synchronization beacon received from a different electronic device included in the second cluster. That is, the first cluster may be merged into the second cluster.

When the second cluster that overlaps with or is adjacent to the first cluster is set for the personal mode, the electronic device included in the first cluster may synchronize with the second cluster regardless of the size of the cluster. That is, the second cluster set for the personal mode may merge with the first cluster which is not set for the personal mode.

A method of an electronic device included in a first cluster having a first attribute may include: acquiring a message associated with a second cluster from an external electronic device included in the second cluster; identifying a second attribute of the second cluster at least based on the message; transmitting information corresponding to the first attribute to the external electronic device when the second attribute satisfies a designated condition; and synchronizing the electronic device with the second cluster when the second attribute does not satisfy the designated condition.

The first cluster may include a different external electronic device, and the synchronizing of the electronic device with the second cluster may include broadcasting a different message including the second attribute to the different external electronic device.

The first attribute may include a first size of the first cluster, the second attribute may include a second size of the second cluster, and the identifying may include comparing the second size with the first size and to determine whether the second attribute satisfies the designated condition.

The first size may be determined according to a number of electronic devices included in the first cluster, a number of hops of the electronic devices included in the first cluster, a number of services provided by the electronic devices synchronized with the first cluster, a security level set for the first cluster, or a combination thereof, and the second size may be determined according to a number of electronic devices included in the second cluster, a number of hops of the electronic devices included in the second cluster, a number of services provided by the electronic devices synchronized with the second cluster, a security level set for the second cluster, or a combination thereof.

The number of the electronic devices included in the first cluster may be determined based on a control parameter of a service response filter.

The second cluster may be synchronized with a third cluster, and the second attribute includes a maximum number of hops included in the second cluster and the third cluster.

The first cluster and the second cluster may include at least one of an NAN and a low-power local area network.

A method of an electronic device included in a first cluster having a first attribute may include: acquiring a message associated with a second cluster from an external electronic device included in the second cluster; identifying a second size of the second cluster at least based on the message; maintaining synchronization with the first cluster when a first size of the first cluster is greater than the second size of the second cluster; and synchronizing the electronic device to the second cluster when the first size of the first cluster is the second size of the second cluster or smaller.

The first size may be determined according to a number of electronic devices included in the first cluster, a number of hops of the electronic devices included in the first cluster, a number of services provided by the electronic devices synchronized with the first cluster, a security level set for the first cluster, or a combination thereof, and the second size may be determined according to a number of electronic devices included in the second cluster, a number of hops of the electronic devices included in the second cluster, a number of services provided by the electronic devices synchronized with the second cluster, a security level set for the second cluster, or a combination thereof.

The first cluster may include a different external electronic device, and the synchronizing of the electronic device with the second cluster may include broadcasting a different message including the second size to the different external electronic device and synchronizing with the second cluster.

The first cluster and the second cluster may include at least one of an NAN and a low-power local area network.

An electronic device and a method according to various embodiments may select a cluster to synchronize with, for example, based on cluster size (for example, the number of electronic devices, a hop count, the number of services, or the like), thereby reducing a cluster merging time and a communication disconnection time caused by the merging of clusters.

An electronic device and a method according to various embodiments may selectively determine merging of clusters, for example, based on a cluster attribute (for example, whether a cluster is private, public, etc.), thereby restricting unnecessary merging of clusters.

According to various embodiments, at least some of the devices (for example, modules or functions thereof) or the method (for example, operations) may be implemented by a command stored in a non-transitory computer-readable storage medium in a programming module form. The instruction, when executed by the processor 120, may cause the one or more processors to execute the function corresponding to the instruction. The non-transitory computer-readable storage medium may be, for example, the memory 130.

The non-transitory computer readable recoding medium may include a hard disk, a floppy disk, magnetic media (e.g., a magnetic tape), optical media (e.g., a compact disc CD-ROM and a digital versatile disc (DVD)), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

A storage medium stores commands, wherein the commands are set for at least one processor to perform at least one operation when executed by the at least one processor, and the at least one operation may include, by an electronic device included in a first cluster having a first attribute: acquiring a message associated with a second cluster from an external electronic device included in the second cluster; identifying a second attribute of the second cluster at least based on the message; transmitting information corresponding to the first attribute to the external electronic device when the second attribute satisfies a designated condition; and synchronizing the electronic device with the second cluster when the second attribute does not satisfy the designated condition.

A storage medium stores commands, wherein the commands are set for at least one processor to perform at least one operation when executed by the at least one processor, and the at least one operation may include, by an electronic device included in a first cluster having a first attribute, acquiring a message associated with a second cluster from an external electronic device included in the second cluster; identifying a second size of the second cluster at least based on the message; maintaining synchronization with the first cluster when a first size of the first cluster is greater than the second size of the second cluster; and synchronizing the electronic device to the second cluster when the first size of the first cluster is the second size of the second cluster or smaller.

The programming module according to the present disclosure may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added. The various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
 a short-range communication module configured to perform communication with one or more external electronic devices;
 a memory configured to store a first security level of a first cluster including the electronic device; and
 a processor configured to:
  acquire a message associated with a second cluster from a first external electronic device included in the second cluster through the short-range communication module,
  identify a second security level of the second cluster at least based on the acquired message,
 determine whether to synchronize the second cluster based on whether the second security level is higher than a reference level,
  restrict the synchronization with the second cluster and control the short-range communication module to transmit information corresponding to the first security level to the first external electronic device when the second security level is higher than the reference level, and
  synchronize the electronic device with the second cluster when the second security level is lower than or equal to the reference level.

2. The electronic device of claim 1, wherein the first cluster includes a second external electronic device, and the processor is further configured to control the short-range communication module to broadcast a message including the second security level to the second external electronic device.

3. The electronic device of claim 1, wherein the processor is further configured to determine whether to synchronize the second cluster based on a first size of the first cluster and a second size of the second cluster, and wherein the processor is further configured to:
  compare the second size with the first size; and
  determine whether to synchronize the second cluster based on the comparison result.

4. The electronic device of claim 3, wherein the first size is determined according to one of a number of electronic devices included in the first cluster, a number of hops of the electronic devices included in the first cluster, a number of services provided by the electronic devices synchronized with the first cluster, and a combination thereof, and
 the second size is determined according to one of a number of electronic devices included in the second cluster, a number of hops of the electronic devices included in the second cluster, a number of services provided by the electronic devices synchronized with the second cluster, and a combination thereof.

5. The electronic device of claim 4, wherein the processor is further configured to extract a size of a service response filter based on an interface address of other electronic devices included in the first cluster, and estimate the number of the electronic devices included in the first cluster based on the size of the service response filter.

6. The electronic device of claim 3, wherein the second cluster is synchronized with a third cluster, and
 wherein the second size includes a maximum number of hops included in the second cluster and the third cluster.

7. The electronic device of claim 1, wherein the first cluster and the second cluster comprise at least one of a neighbor awareness networking (NAN) and a low-power local area network.

8. The electronic device of claim 1, wherein the processor is further configured to:
 compare the first security level with the reference level,
 restrict the synchronization with the second cluster when the first security level is higher than the reference level, and
 perform an operation that determines whether to synchronize the second cluster based on whether the second security level is higher than the reference level when the first security level is lower than the reference level.

9. An electronic device comprising:
 a short-range communication module configured to perform communication with one or more external electronic devices;
 a memory configured to store a first size of a first cluster including the electronic device; and
 a processor configured to:
  acquire a message associated with a second cluster from a first external electronic device included in the second cluster through the short-range communication module,
  identify a second size of the second cluster at least based on the acquired message,
  maintain synchronization with the first cluster when the first size of the first cluster is greater than the second size of the second cluster, and
  synchronize the electronic device to the second cluster when the first size of the first cluster is less than or equal to the second size of the second cluster,
 wherein the first size of the first cluster is obtained by extracting a size of a service response filter based on an interface address of other electronic devices included in the first cluster and estimating a number of the electronic devices included in the first cluster based on the size of the service response filter.

10. The electronic device of claim 9, wherein the first size is determined according to one of a number of electronic devices included in the first cluster, a number of hops of the electronic devices included in the first cluster, a number of services provided by the electronic devices synchronized with the first cluster, a security level set for the first cluster, and a combination thereof, and the second size is determined according to one of a number of electronic devices included in the second cluster, a number of hops of the electronic devices included in the second cluster, a number of services provided by the electronic devices synchronized with the second cluster, a security level set for the second cluster, or a combination thereof.

11. The electronic device of claim 9, wherein the first cluster comprises a second external electronic device, and wherein the processor is further configured to:
control the short-range communication module to broadcast a message including the second size to the second external electronic device; and
synchronize with the second cluster.

12. The electronic device of claim 9, wherein the first cluster and the second cluster include at least one of a neighbor awareness networking (NAN) and a low-power local area network.

13. The electronic device of claim 9, wherein the processor is further configured to determine the first size of the first cluster based on the size of the service response filter, the number of bits of the service response filter, and the number of hash functions included in the service response filter.

14. A method of an electronic device included in a first cluster having a first security level, the method comprising:
acquiring a message associated with a second cluster from a first external electronic device included in the second cluster;
identifying a second security level of the second cluster at least based on the acquired message;
determining whether to synchronize the second cluster based on whether the second security level is higher than a reference level;
restricting the synchronization with the second cluster and transmitting information corresponding to the first security level to the first external electronic device when the second security level is higher than the reference level; and
synchronizing the electronic device with the second cluster when the second security level does is lower than or equal to the reference level.

15. The method of claim 14, wherein the first cluster includes a second external electronic device, and synchronizing the electronic device with the second cluster includes broadcasting a message including the second security level to the second external electronic device.

16. The method of claim 14, wherein determining whether to synchronize the second cluster based on whether the second security level is higher than the reference level comprises:
determining whether to synchronize the second cluster based on a first size of the first cluster and a second size of the second cluster.

17. The method of claim 16, wherein the first size is determined according to one of a number of electronic devices included in the first cluster, a number of hops of the electronic devices included in the first cluster, a number of services provided by the electronic devices synchronized with the first cluster, and a combination thereof, and
the second size is determined according to one of a number of electronic devices included in the second cluster, a number of hops of the electronic devices included in the second cluster, a number of services provided by the electronic devices synchronized with the second cluster, and a combination thereof.

18. The method of claim 17, further comprising:
extracting a size of a service response filter based on an interface address of other electronic devices included in the first cluster; and
determining the number of the electronic devices included in the first cluster based on the control parameter.

19. The method of claim 17, wherein the second cluster is synchronized with a third cluster, and the second size comprises a maximum number of hops included in the second cluster and the third cluster.

20. The method of claim 14, wherein determining whether to synchronize the second cluster based on whether the second security level is higher than the reference level comprises:
comparing the first security level with the reference level;
restricting the synchronization with the second cluster when the first security level is higher than the reference level; and
performing an operation that determines whether to synchronize the second cluster based on whether the second security level is higher than the reference level when the first security level is lower than the reference level.

* * * * *